(12) United States Patent
O'Connor

(10) Patent No.: US 8,219,254 B2
(45) Date of Patent: Jul. 10, 2012

(54) ADAPTIVE CONTROL FOR IRRIGATION SYSTEM

(75) Inventor: Thomas M. O'Connor, Tarpon Springs, FL (US)

(73) Assignee: Water Optimizer LLC., Tampa, FL (US)

( * ) Notice: Subject to any disclaimer, the term of this patent is extended or adjusted under 35 U.S.C. 154(b) by 0 days.

(21) Appl. No.: 12/800,022

(22) Filed: May 6, 2010

(65) Prior Publication Data

US 2010/0222932 A1    Sep. 2, 2010

Related U.S. Application Data

(63) Continuation-in-part of application No. 11/985,815, filed on Nov. 16, 1997.

(60) Provisional application No. 60/860,276, filed on Nov. 20, 2006, provisional application No. 60/962,325, filed on Jul. 27, 2007.

(51) Int. Cl.
*G05D 7/06* (2006.01)

(52) U.S. Cl. ........ 700/282; 700/284; 700/285; 340/602; 405/37; 405/38; 405/43; 73/73; 137/78.3

(58) Field of Classification Search .................. 700/282, 700/284; 137/78.3; 340/602
See application file for complete search history.

(56) References Cited

U.S. PATENT DOCUMENTS

| | | | | |
|---|---|---|---|---|
| 3,732,435 A * | 5/1973 | Strandberg et al. | ........... | 307/118 |
| 4,892,113 A * | 1/1990 | Fattahi | ........... | 137/78.3 |
| 5,060,859 A * | 10/1991 | Bancroft | ........... | 239/64 |
| 6,904,331 B2 * | 6/2005 | Sasaki et al. | ........... | 700/128 |
| 7,063,270 B2 * | 6/2006 | Bowers et al. | ........... | 239/1 |
| 7,133,749 B2 * | 11/2006 | Goldberg et al. | ........... | 700/284 |
| 7,203,576 B1 * | 4/2007 | Wilson et al. | ........... | 700/284 |
| 7,258,129 B1 * | 8/2007 | Donahoo | ........... | 137/78.3 |
| 7,289,823 B1 * | 10/2007 | Kumar et al. | ........... | 455/550.1 |
| 7,412,303 B1 * | 8/2008 | Porter et al. | ........... | 700/284 |
| 7,413,380 B2 * | 8/2008 | Corwon et al. | ........... | 405/37 |
| 7,574,284 B2 * | 8/2009 | Goldberg et al. | ........... | 700/284 |
| 7,584,023 B1 * | 9/2009 | Palmer et al. | ........... | 700/284 |
| 7,836,910 B2 * | 11/2010 | Dresselhaus et al. | ........... | 137/78.3 |
| 2001/0049563 A1 * | 12/2001 | Addink et al. | ........... | 700/19 |
| 2003/0080199 A1 * | 5/2003 | Condreva | ........... | 239/63 |
| 2008/0288116 A1 * | 11/2008 | Nickerson | ........... | 700/284 |
| 2010/0094472 A1 * | 4/2010 | Woytowitz et al. | ........... | 700/284 |
| 2010/0147389 A1 * | 6/2010 | Blanchard | ........... | 137/1 |

(Continued)

OTHER PUBLICATIONS

US department of the Interior Bureau of Reclamation, "Reclamation managing Water in the West", 2nd edition, Aug. 2007, pp. 132.*

(Continued)

*Primary Examiner* — Albert Decady
*Assistant Examiner* — Olvin Lopez Alvarez
(74) *Attorney, Agent, or Firm* — Frijouf, Rust & Pyle P.A

(57) ABSTRACT

A combined water management and communication system for a water provider wirelessly communicating with selected ones of the multiplicity of user wireless transceiver for changing water distribution to selective ones of the multiplicity of independent users upon an undesired water flow characteristic within the water distribution channels. The multiplicity of user wireless transceivers communicating with proximate user wireless transceivers for forming a network for communicating information to a third party wireless transceiver unrelated to liquid flow. The invention is also incorporated into a remote controlled solar operated wireless irrigation valve. The invention is further incorporated into an improved water management irrigation system incorporating an adaptive weather based controller that is adjusted by a weather based sensor base controller.

6 Claims, 18 Drawing Sheets

U.S. PATENT DOCUMENTS

2010/0179701 A1*  7/2010  Gilbert et al. .................. 700/284
2011/0036155 A1*  2/2011  Dresselhaus et al. ............. 73/73
2011/0093122 A1*  4/2011  Koumoudis .................. 700/284

OTHER PUBLICATIONS

The Toro Company, Intelli-Sense TIS-612, 2004, pp. 1-58.*
Hunter, "ET system", Jul. 2008, pp. 35.*
Federal register, fedreal Register Notices), Feb. 2011, pp. 14.*
WaterOptimizer Inc, "WaterOptimizer controller", downloaded 2011, pp. 6.*

* cited by examiner

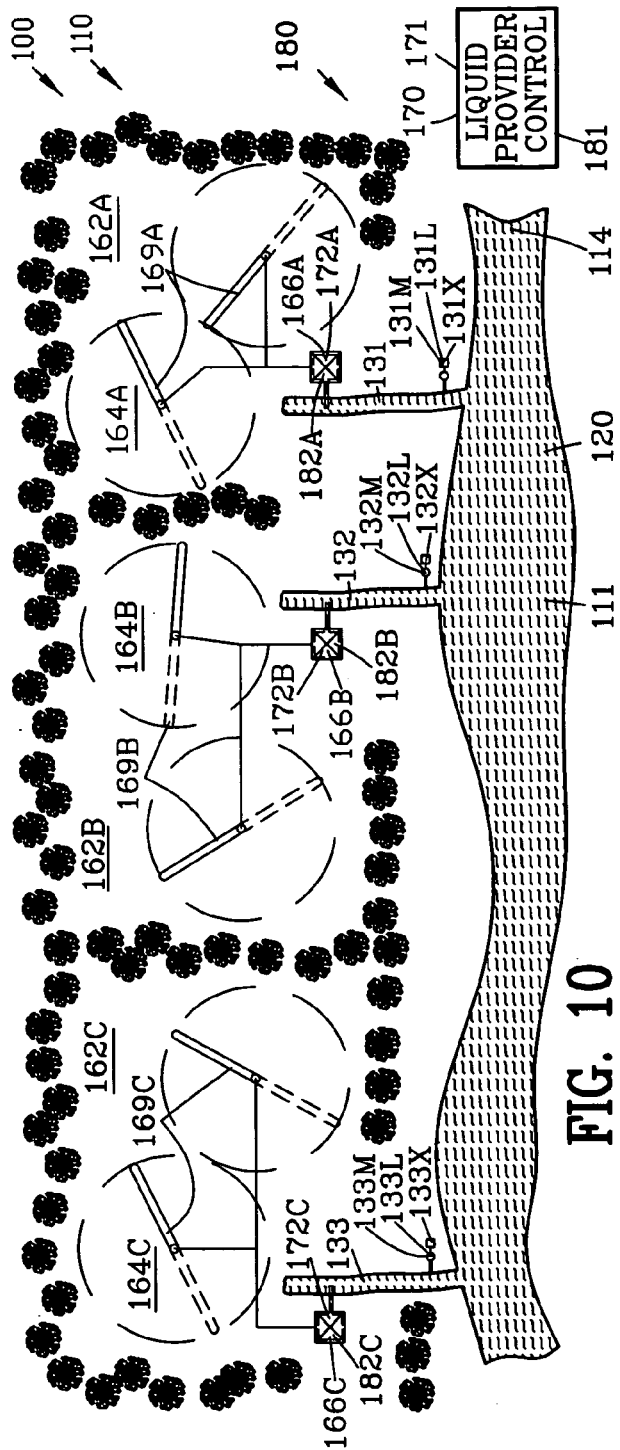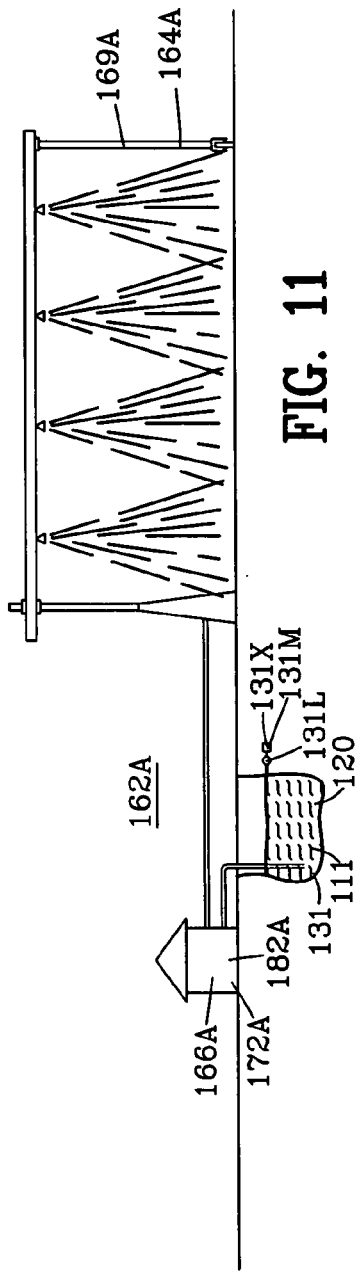

ADAPTIVE CONTROL FOR IRRIGATION SYSTEM

CROSS-REFERENCE TO RELATED APPLICATIONS

This application is a continuation-in-part of U.S. application Ser. No. 11/985,815 filed Nov. 16, 2007. U.S. application Ser. No. 11/985,815 filed Nov. 16, 2007 claims benefit of U.S. provisional application Ser. No. 60/860,276 filed Nov. 20, 2006 and U.S. provisional application Ser. No. 60/962,325 filed Jul. 27, 2007. All subject matter set forth in U.S. application Ser. No. 11/985,815 filed Nov. 16, 2007 and U.S. provisional application Ser. No. 60/860,276 filed Nov. 20, 2006 and U.S. provisional application Ser. No. 60/962,325 filed Jul. 27, 2007 is hereby incorporated by reference into the present application as if fully set forth herein.

BACKGROUND OF THE INVENTION

1. Field of the Invention

This invention relates to the control of liquid and more particularly to the control of fluids in a fluid distribution system in combination with a wireless communication system.

2. Background of the Invention

The prior art has proposed various types of liquid control systems for controlling the flow and distribution of liquids. Some of these prior art liquid control systems relate to water control systems for controlling the flow and distribution of water. Recently, many water control systems have been provided to manage the volume of water used by agricultural, commercial, industrial, recreational or residential sites. These water management control systems have reduced the volume of water used through the limitation of the volume of water used and/or by reclaiming water. These liquid control systems have resulted in a substantial reduction of the use of water at commercial, industrial, recreational or residential sites.

The irrigation of vegetation for agricultural, commercial, industrial, recreational or residential sites is a significant interest in the management of water. Many of liquid control systems for irrigation systems reduce the volume of water use by compensating for rainfall, humidity, temperature and the like. These liquid control systems have resulted in a substantial reduction of the use of water for irrigation systems in agricultural, commercial, industrial, recreational or residential sites.

The following United States patents are representative of liquid control systems directed to the reduction of the use of water for a commercial or a residential site.

U.S. Pat. No. 4,176,395 to Evelyn-Veere et at. discloses an irrigation control system and a related method for controlling a large number of valves in accordance with a plurality of schedules of instructions provided by the user of the system. Schedules of instructions may be created or modified during normal operation of the system by utilizing a variety of command sequences on a keyboard and display device, and schedules may also be reviewed or monitored during operation. The control system includes apparatus for processing a plurality of digital inputs by means of which the conditions of sensing devices located in the field are monitored and can be used to condition execution of the schedules of instructions. The control system is disclosed for use with a two-wire irrigation system in which on/off control signals are encoded into a power signal for transmission along a pair of wires to which decoding units are connected. The control system includes an input/output service module which transmits on/off control signals to the decoding units repeatedly, as rapidly as the two-wire system will permit, to ensure that the valves remain switched in the manner intended.

U.S. Pat. No. 5,251,153 to Nielsen et al. discloses a programmed irrigation controller automatically computes durations for schedules and controls split irrigation cycles at up to eight watering stations. The controller is manually entered with high-level information regarding soil type, terrain, and irrigation system watering head type, and also with a total irrigation time, for each station. The maximum "on" time duration for each individual split irrigation cycle, and a minimum "off" time duration, are determined from the high-level information input by table lookup. The controller computes the number of irrigation cycles at each station as its total irrigation time divided by its maximum "on" time duration. The controller schedules composite irrigation cycles for all stations so that no station over-eaters within a single irrigation cycle or upon successive irrigation cycles that are too closely time proximate. Exclusionary time-of-day intervals that specify when no watering will occur can be inserted within the schedules. A water budgeting factor proportionately controls the numbers of split irrigation cycles. Special overlaid schedules provide useful special irrigation sequences/durations such as one-time deep soak, periodic deep soak, or syringe cycles. The programmed irrigation control for a single station may be copied for the control of additional stations, U.S. Pat. No. 5,293,554 to Nicholson discloses a program controlled irrigation system operates with two programs. Program A and Program B, for irrigating a plurality of zones. Selected zones are dedicated to the irrigation of grass, for example, under Program A while other zones are dedicated to the irrigation of shrubs, for example, under Program B. A total of six times for starting an irrigation cycle are available for both Programs A and B. Under program control, the six starting times can be allocated in any combination to Programs A and B. Further, starting times can be shifted readily between Programs A and B thereby providing flexibility to meet the changing demands in grass and shrub irrigation. Each zone is constantly monitored for overcurrent conditions wherein zone operation is terminated if the overcurrent of the particular zone is sustained beyond a set period. Also, if the current reaches an excessive level in a very short period, zone operation is terminated. Even though a single zone operation has been terminated as noted above, other zones can continue to operate unless the operation of two successive zones has been terminated whereupon the operation of the entire system is terminated.

U.S. Pat. No. 5,870,302 to Oliver discloses a system and method for using evapotranspiration (ET) and/or predicted precipitation data in controlling automated and semi-automated irrigation systems. In accordance with the present invention, meteorological data is monitored and used to adjust watering schedules for an irrigation site. A central computer uses the meteorological data and ET data to compute a watering factor. The watering factor represents the difference between a reference watering schedule (which can be stored at the irrigation site) and a new watering schedule. The new watering schedule can be based on similar climatic conditions of a geographic area in which the irrigation site is located. The watering factor is then sent to the irrigation site, which uses the watering factor to modify the reference watering schedule. Alternatively, meteorological data and site characteristics can be monitored at the irrigation site and sent to the central computer, which then computes the watering factor based on this specific site information. The computed ET data is preferably based on a current prediction of future events based upon present meteorological conditions.

U.S. Pat. No. 6,240,336 to Brundisini discloses a control unit for an irrigation system comprising a programmable electronic control unit having a plurality of output control lines for the control of actuators of the irrigation system and comprising a microprocessor for setting data that condition the operation of the control unit. The microprocessor is operable to allow a standard programming of the electronic control unit for setting data suitable for allowing the base operation of the control unit, and an advanced programming for setting further data suitable for customizing the base operation of the control unit.

U.S. Pat. No. 6,312,191 to Rosenfeld discloses a self-contained ecological watering system, protected against obturations, and capable of irrigating at low cost uniformly and regularly a variety of cultivated areas; the system operates automatically a series of fertinigation cycles requiring minimum actuation power and reduced water flow rate. The system permits implementation of various configuration including a plurality of local subsystems which are controllable locally or from a remote station; each subsystem comprises a container capable of accumulating the volume of liquid to be discharged per cycle, a watering assembly capable of regulating the watering volume and discharging it upon receiving a low power signal; a low consumption electronic control unit capable of determining the frequency and the appropriate time to send said signal; and a low restriction distribution network capable of transporting the water to irrigate the locations in need.

U.S. Patent application 2003/0179102 to Barnes discloses a system for controlling an irrigation system having a monitor for remotely monitoring and communicating irrigation related information in the system, a controller in communication with the monitoring means for receiving the information, processing the information to coding functional commands, and sending the information to the irrigation system, and a decoder in communication with the controller for decoding the coded signal at specific sites in the irrigation system and performing a function based upon the signal. A method for remotely controlling an irrigation system by providing the system with irrigation related information and remotely modulating the system based upon the irrigation related information. A software program controls an irrigation system, the program having a central processing unit for running the program and an algorithm for controlling the irrigation system.

U.S. Patent application 2004/0039489 to Moore et al. discloses an irrigation control system and method for controlling irrigation based on weather data. Weather data such as wind, temperature, solar radiation, humidity, and rainfall, may be collected at one or more weather stations for a region. The weather data may be compiled on a computer and transmitted to a paging broadcast service. The weather data may then be transmitted by the paging broadcast service to controller interfaces associated with irrigation systems throughout the region. The controller interfaces may adjust irrigation controllers associated with the irrigation systems based on the weather data such that the proper amount of water is applied. This allows the water to be used more efficiently and the health of the landscape to be improved.

U.S. Patent application 2004/0064217 to Addink et at. discloses a recording node at a consumer site that is used for the receiving, storing, determining and/or sending of utility commodity information. The recording node is an integral part of networks or can access networks for the receiving and transmitting of information. The recording node is part of a network process control system that includes other nodes, such as a controller, computer, monitor, display and communication node. The recording node receives data on utility commodity flow rates, commodity pressure and environmental factors; stores the data; performs determinations on the data; and sends utility commodity information over the network to consumers and/or third parties. The utility commodity may be water, electricity and/or gas. The information the consumers and third parties receive over the network from the recording node and other nodes assists them in their management of process systems.

U.S. Patent application 2004/0078092 to Addink et al. discloses a system and method in which an irrigation management system reduces high peak water use values by utilizing a microprocessor disposed in an irrigation controller to receive peak water use information from a water supplier receive water use information at a consumer site and automatically derive a new irrigation schedule that is at least partly based on the information received. The new irrigation schedule, derived by the microprocessor, may include a modification in a default irrigation frequency, a modification in a default irrigation start time(s), a reduction in a default irrigation application duration, the use of a rolling-average in the determination of the new irrigation application duration and other changes or modifications to the default irrigation schedule that will provide for the reduction in high peak water use values. Additionally, the microprocessor will display to the water user and/or third parties details on the new irrigation schedule and information received from the water supplier.

U.S. Patent application 2004/0117330 to Ehlers et al. discloses a system and method manage delivery of energy from a distribution network to one or more sites. Each site has at least one device coupled to the distribution network. The system includes a node and a control system. The node is coupled to the at least one device for sensing and controlling energy delivered to the device. A control system is coupled to the node and distribution network for delivering to the node at least one characteristic of the distribution network. The node for controls the supply of energy to the device as a function of the at least one characteristic.

U.S. Patent application 2004/0133314 to Ehlers et al. discloses a system and method manage delivery of energy from a distribution network to one or more sites. Each site has at least one device coupled to the distribution network. The at least one device controllably consumes energy. The system includes a node and a control system. The node is coupled to the at least one device for sensing and controlling energy delivered to the device. A control system is coupled to the node and distribution network for delivering to the node at least one characteristic of the distribution network. The node for controls the supply of energy to the device as a function of the at least one characteristic.

U.S. Patent application 2004/0138981 to Ehlers et al, discloses a system and method manage delivery of energy from a distribution network to one or more sites. Each site has at least one device couple to the distribution network. The at least one device controllably consumes energy. The system includes a node and a control system. The node is coupled to the at least one device for sensing and controlling energy delivered to the device. A control system is coupled to the node and distribution network for delivering to the node at least one characteristic of the distribution network. The node for controls the supply of energy to the device as a function of the at least one characteristic, U.S. Patent application 2004/0139038 to Ehlers et al. discloses a system and method manage delivery of energy from a distribution network to one or more sites. Each site has at least one device couple to the distribution network. The at least one device controllably consumes energy. The system includes a node and a control system. The node is coupled to the at least one device for sensing and controlling energy delivered to the device. A control system is coupled to the node and distribution network for delivering to the node at least one characteristic of the distribution network. The node for controls the supply of energy to the device as a function of the at least one characteristic.

U.S. Patent application 2005/0033707 to Ehlers et al. discloses system and method manage delivery of energy from a distribution network to one or more sites. Each site has at least one device coupled to the distribution network. The at least one device controllably consumes energy. The system includes a node and a control system. The node is coupled to the at least one device for sensing and controlling energy delivered to the device. A control system is coupled to the node and distribution network for delivering to the node at least one characteristic of the distribution network. The node for controls the supply of energy to the device as a function of the at least one characteristic.

U.S. Patent application 2005/0137752 to Alvarez discloses a wireless sensor and control transmitter system is provided for operating an irrigation or other hydraulic system. The system includes a master module unit hardwired to and in communication with the hydraulic system controller, and a field module unit that is hardwired to and in communication with field electromechanical control devices such as valves, solenoids and servo motors, and field sensors indicating, for example, atmospheric conditions. The master module unit and field module unit communicate with digital wireless communication and can act as a simple wireless bridge. The master module and field module units are capable of digitizing input signals from the devices to which they are hardwired and transmitting them to the opposite module; they are further capable of deciphering the digitized signals received to reproduce the original input signal and communicating it to the device to which it is hardwired. Supplemental functionality may be added to an existing hydraulic control system by including the WSCX and its system features of control and sensor functionality that may not otherwise be available in an existing controller system.

U.S. Patent application 2006/0116791 to Ravula et al. discloses an intelligent local irrigation system includes one or more sprinklers and a controller coupled to the one or more sprinklers via a wired or wireless connection and enabled to control the sprinklers thereby. A controller arrangement establishes connectivity with an internet service portal which stores a profile of the local irrigation system and which obtains information from internet-based resources. The internet service portal determines an irrigation schedule based on the profile and on information obtained from the internet-based information resources and provides the irrigation schedule to the controller arrangement for implementation.

U.S. Patent application 2006/0161309 to Moore et al. discloses an irrigation control system and method for controlling irrigation based on weather data. Weather data such as wind, temperature, solar radiation, humidity, and rainfall, may be collected at one or more weather stations for a region. The weather data may be compiled on a computer and transmitted to a paging broadcast service. The weather data may then be transmitted by the paging broadcast service to controller interfaces associated with irrigation systems throughout the region. The controller interfaces may adjust irrigation controllers associated with the irrigation systems based on the weather data such that the proper amount of water is applied. This allows the water to be used more efficiently and the health of the landscape to be improved.

Although the liquid control systems set forth in the foregoing United States Patents have reduced the use of water, these liquid control systems have not addressed the problems associated with the water distribution systems between a water source and an agricultural, commercial, industrial, recreational or residential site. The recent and substantial increase in the number of agricultural, commercial, industrial, recreational or residential sites have placed an excessive burden upon the existing distribution systems between the water source and the agricultural, commercial, industrial, recreational or residential sites. Many of these liquid distribution systems have not been upgraded to accommodate for recent and substantial increase in the number of agricultural, commercial, industrial, recreational or residential sites due to the substantial time, substantial inconvenience and the substantial cost of upgrading associated with upgrading these distribution systems.

The above mentioned have contributed to the water management in agricultural, commercial, industrial, recreational or residential sites but have not addressed the issue of the management of water from a water provider to the agricultural, commercial, industrial, recreational or residential sites.

The recent and substantial increase in the number of agricultural, commercial, industrial, recreational or residential site sites have placed an excessive burden upon the existing distribution systems between the water source and the agricultural, commercial, industrial, recreational or residential sites. Many of these liquid distribution systems have not been upgraded to accommodate for recent and substantial increase in the number of agricultural, commercial, industrial, recreational or residential sites due to the substantial time, substantial inconvenience and the substantial cost of upgrading associated with upgrading these distribution systems.

In my prior application Ser. No. 11/985,815 filed Nov. 16, 2007, I disclosed a control system for regulating the flow of a liquid from a liquid provider through a liquid distribution system.

It is an object of the present invention to expand upon my prior invention set forth in my prior application Ser. No. 11/985,815 filed Nov. 16, 2007 by providing enhanced communication to a third party wireless transceiver unrelated to liquid flow.

Another object of this invention is to provide a remote controlled solar operated wireless irrigation valve.

Another object of this invention is to provide an improved water management irrigation system incorporating an adaptive weather based controller that is adjusted by a weather based sensor base controller.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention and the detailed description describing the preferred embodiment of the invention.

SUMMARY OF THE INVENTION

The present invention is defined by the appended claims with specific embodiments being shown in the attached drawings. For the purpose of summarizing the invention, the invention relates to a combined water management and communication system for regulating water flow from a water provider through water distribution channels to a multiplicity of user channels servicing a multiplicity of independent users. The combined water management and communication system comprises a plurality of water monitors located in the water distribution channels for sensing a water flow characteristic therein. A water provider includes a wireless transceiver. A multiplicity of controllable user valves are interposed in the multiplicity of user channels, respectively, for controlling a portion of the water connected to each of the multiplicity of independent users directed to irrigation. The water provider wireless transceiver communicates with selected ones of the multiplicity of user wireless transceiver for changing selective ones of the controllable user valves of the multiplicity of independent users upon sensing an undesired water flow characteristic within the water distribution channels for restoring a desired water flow characteristic within the water distribution channels. The multiplicity of user wireless transceivers communicates with adjacent user wireless transceivers for forming a network for communicating information to a third party wireless transceiver unrelated to liquid flow.

In a more specific embodiment of the invention, the multiplicity of user wireless transceiver forms a wireless mesh network for communication with a third party wireless transceiver. Examples of the information communicated to a third party wireless transceiver unrelated to liquid flow include information from parking meters, electrical meters, gas meters, street lights, rain fall gauges, soil moisture gages, weather stations, security and smart home systems.

The invention is also embodied in a remote controlled valve unit for an irrigation system comprising an electrically operated valve powered by a battery. A wireless transceiver for communicates with adjacent wireless transceivers. A control is interconnected to the electrically operated valve and the battery and the wireless transceiver for opening and closing the electrically operated valve in accordance with communications from the remote transceiver. a photovoltaic device is connected to the battery for charging the battery upon impingement of electromagnetic radiation.

The invention is also embodied in an improved water management system for controlling an irrigation system for watering the soil in an irrigated region comprising a programmable memory for storing user set parameters related to the environment and plant life to provide a desired moisture level in the soil in the irrigated region. A weather based controller is connected to the irrigation system for watering the soil in an irrigated region in accordance with the user set parameters. A sensor base controller is connected to a moisture sensor for sensing an actual moisture level in the soil in the irrigated region. A comparator compares the actual moisture level in the soil of the irrigated region with the desired moisture level provided by the user set parameters. A tolerance control is connected to the comparator for modifying the user set parameters to adjust the operation of the weather based controller to be in accordance with the difference between the desired moisture level provided by the user set parameters and the actual moisture in the soil in the irrigated region.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the specific embodiments may be modified for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 10 is a top view of a second example of a liquid distribution system;

FIG. 11 is a side view of the liquid distribution system of FIG. 10;

Similar reference characters refer to similar parts throughout the several Figures of the drawings.

DETAILED DISCUSSION

Figure 1:
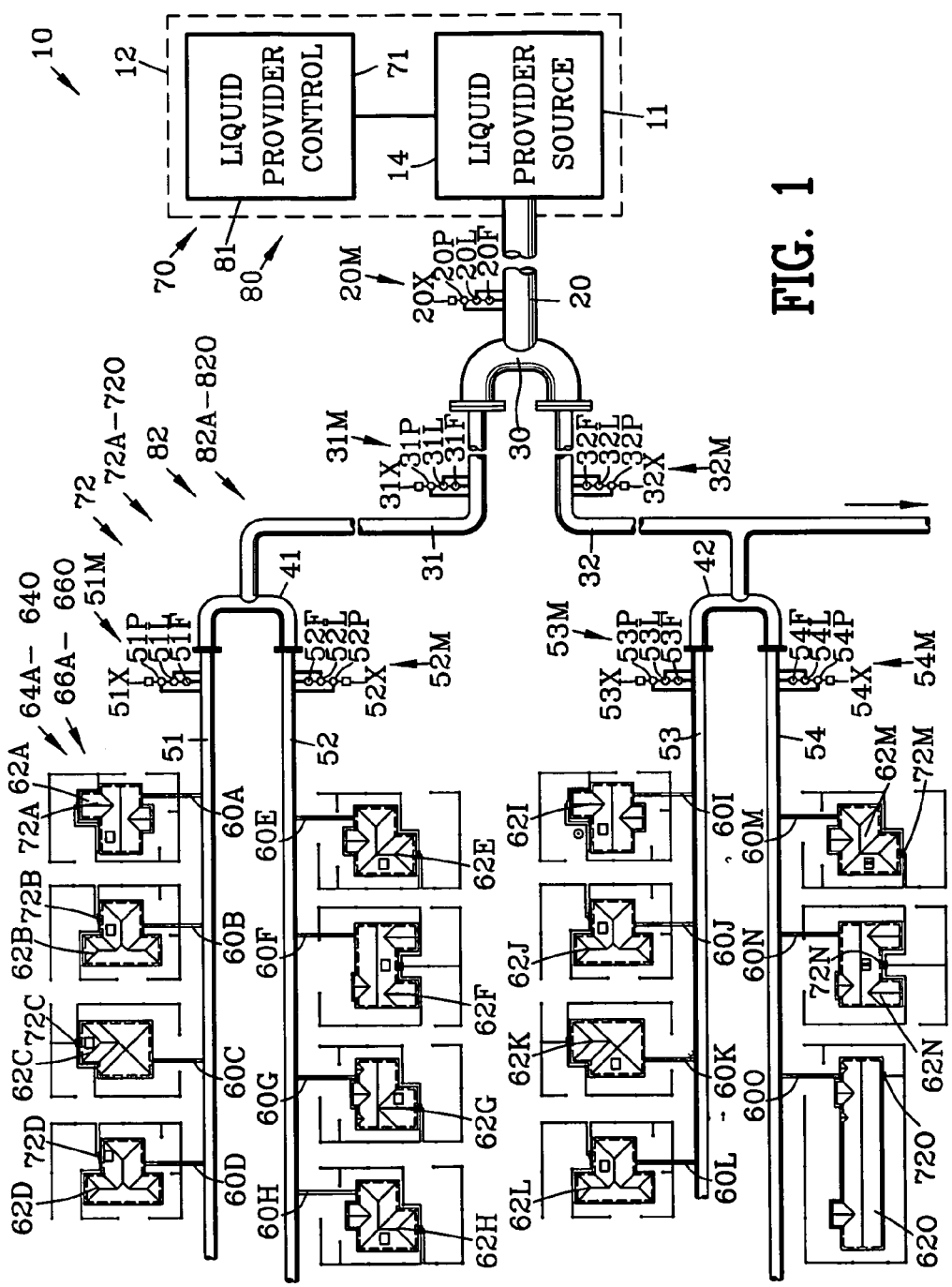
FIG. 1 is a top view of a first section of a first example of a liquid distribution system incorporating the present invention.
Figure 1A:
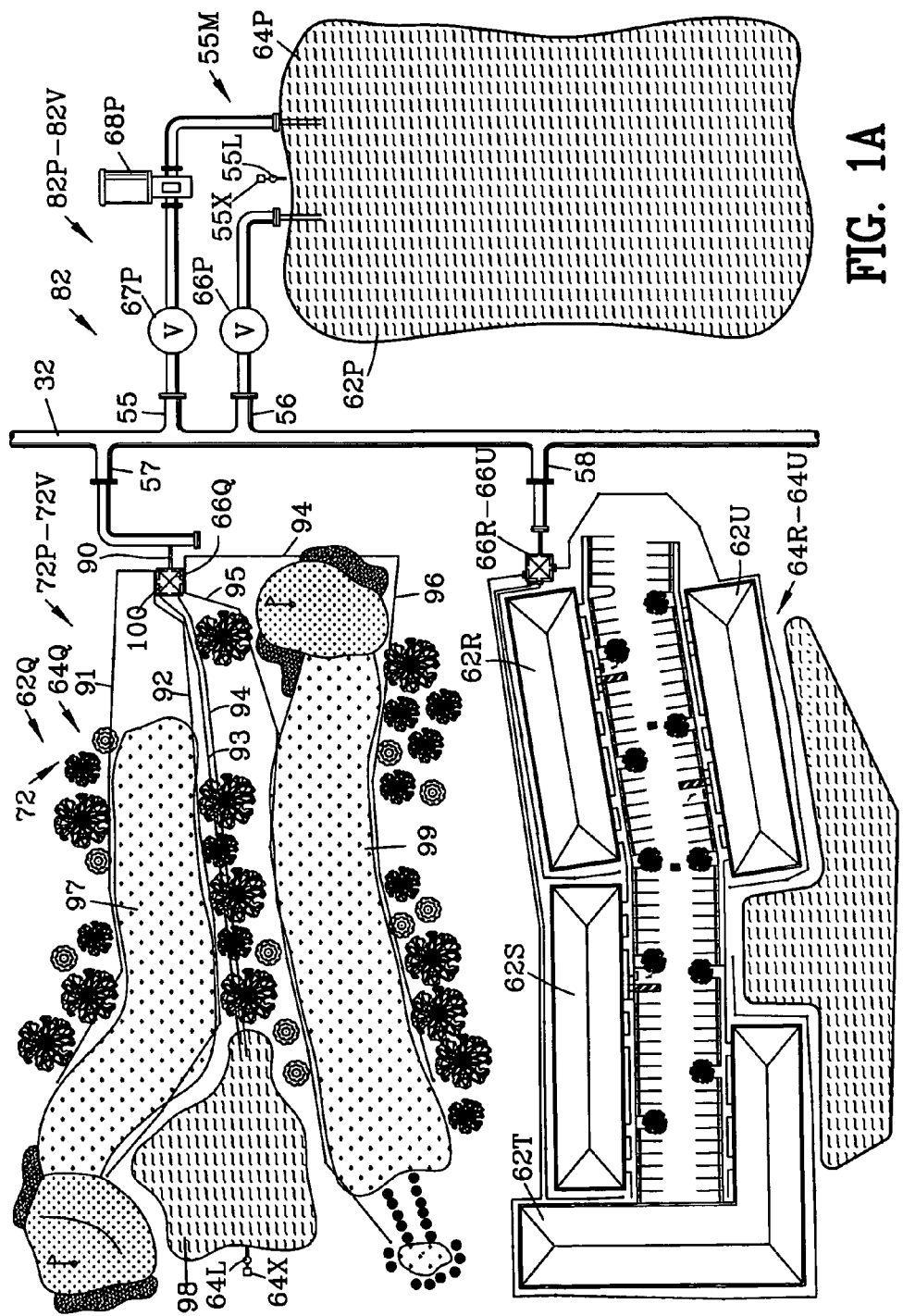
FIG. 1A is a top view of a second section of the liquid distribution system.

FIGS. 1 and 1A are top views of a first example of a liquid distribution system 10 for regulating the flow of a liquid 11 from a liquid provider 12 having a liquid source 14. In this example, the liquid provider 12 has been shown to be water provider 12 having a water source 14 such as a municipal water plant 12 or the like. However it should be appreciated by those skilled in the art that the present invention should not be limited to a water distribution system.

The distribution system 10 has a major liquid distribution channel 20 extending from the liquid provider 12. In this example, the major liquid distribution channel 20 is show as a liquid distribution conduit or pipe. The major liquid distribution channel 20 has a liquid monitor 20M for sensing a liquid flow characteristic within the liquid major liquid distribution channel 20. The liquid monitor 20M provides a signal output relative to the liquid flow characteristic within the major liquid distribution channels 20.

The liquid monitor 20M may comprise one or more liquid flow monitor 20F, a liquid level monitor 20L or a liquid pressure monitor 20P. The liquid flow monitor 20F senses a liquid flow characteristic such as a liquid flow rate within the major liquid distribution channel 20. The liquid level monitor 20L senses a liquid level characteristic such as a liquid level within the major liquid distribution channel 20. The liquid pressure monitor 20P senses a liquid pressure characteristic such as a liquid pressure within the major liquid distribution channel 20.

A remote telemetry unit 20X is connected to the liquid monitor 20M for providing communication between the liquid monitor 20M and the liquid provider 12. The remote telemetry unit 20X is connected to one or more of the liquid flow monitor 20F, the liquid level monitor 20L or the liquid pressure monitor 20P. The remote telemetry unit 20X relays the signal output from one or more of the liquid flow monitor 20F, the liquid level monitor 20L or the liquid pressure monitor 20P to the liquid provider 12 as will be described in greater detail hereinafter. In one embodiment of the invention, the remote telemetry unit 20X relays the signal output from one or more of the liquid flow monitor 20F, the liquid level monitor 20L or the liquid pressure monitor 20P upon sensing a liquid flow characteristic within the major liquid distribution channels 20. The remote telemetry unit 20X may relay information to the liquid provider 12 by a number of suitable means such as a wire connection, wireless connections, internet connections and the like as will be described in greater detail with reference to FIG. 4. The remote telemetry unit 20X may also receive signals from the liquid provider 12. The signals received by the remote telemetry unit 20X from the liquid provider 12 may include various types of signals such as reset signals, calibration signals and the like.

A manifold 30 directs the liquid 11 from the major distribution channel 20 to minor distribution channels 31 and 32 shown as liquid distribution conduits or pipes. The minor distribution channel 31 includes a liquid monitor 31M connected to a remote telemetry unit 31X. The liquid monitor 31M may comprise one or more of a liquid flow monitor 31F, a liquid level monitor 31L or a liquid pressure monitor 31P. The remote telemetry unit 31X communicates with the liquid provider 12 to relay the signal output from the one or more of the liquid flow monitor 31F, the liquid level monitor 31L or the liquid pressure monitor 31P regarding the liquid flow characteristic within the major liquid distribution channels 31.

Similarly, the minor distribution channel 32 includes a liquid monitor 32M connected to a remote telemetry unit 32X. The liquid monitor 32M may comprise one or more of a liquid flow monitor 32F, a liquid level monitor 32L or a liquid pressure monitor 32P. The remote telemetry unit 32X communicates with the liquid provider 12 to relay the signal output from the one or more of the liquid flow monitor 32F, the liquid level monitor 32L or the liquid pressure monitor 32P regarding the liquid flow, characteristic within the major liquid distribution channels 32.

A manifold 41 directs the liquid 11 from minor distribution channel 31 to local liquid distribution channels 51 and 52. The liquid distribution channels 51 includes a liquid monitor 51M connected to a remote telemetry unit 51X. The liquid monitor 51M may comprise one or more of a liquid flow monitor 51F, a liquid level monitor 51L or a liquid pressure monitor 51P. The remote telemetry unit 51X communicates with the liquid provider 12 to relay the signal output from the one or more of the liquid flow monitor 51F, the liquid level monitor 51L or the liquid pressure monitor 51P regarding the liquid flow characteristic within the major liquid distribution channels 51.

The liquid distribution channel 52 includes a liquid monitor 52M connected to a remote telemetry unit 52X. The liquid monitor 52M may comprise one or more of a liquid flow monitor 52F, a liquid level monitor 52L or a liquid pressure monitor 52P. The remote telemetry unit 52X communicates with the liquid provider 12 to relay the signal output from the one or more of the liquid flow monitor 52F, the liquid level monitor 52L or the liquid pressure monitor 52P regarding the liquid flow characteristic within the major liquid distribution channels 52.

A manifold 42 directs the liquid 11 from minor distribution channel 32 to local liquid distribution channels 53 and 54. The liquid distribution channel 53 includes a liquid monitor 53M connected to a remote telemetry unit 53X. The liquid monitor 53M may comprise a liquid flow monitors 53F and/or a liquid level monitor 53L and/or a liquid pressure monitor 53P. The remote telemetry unit 53X communicates with the liquid provider 12 to relay the signal output from the one or more of the liquid flow monitor 53F, the liquid level monitor 53L or the liquid pressure monitor 53P regarding the liquid flow characteristic within the major liquid distribution channels 53.

The liquid distribution channel 54 includes a liquid monitor 54M connected to a remote telemetry unit 54X. The liquid monitor 54M may comprise a liquid flow monitor 54F and/or a liquid level monitor 54L and/or a liquid pressure monitor 54P. The remote telemetry unit 54X communicates with the liquid provider 12 to relay the signal output from the one or more of the liquid flow monitor 54F, the liquid level monitor 54L or the liquid pressure monitor 54P regarding the liquid flow characteristic within the major liquid distribution channels 54.

The local liquid distribution channels 51-54 provide liquid flow to a multiplicity of users through user channels 60A-600. In this example, the multiplicity of users are shown as user sites 62A-620 to be representative of tracts of land having commercial, industrial, residential or recreational land uses. In this example, the user sites 62A-620 are shown as residential land uses. Each of the user sites has a user irrigation system 64A-640 controlled by controllable user valve 66A-660 for irrigating the respective tracks of land 62A-620. The term valve or controllable user valve as contemplated herein is intended to embrace various types of flow control devices including gates, weirs and the like.

FIG. 1A illustrates the continuation of the minor liquid distribution channel 32 for providing the liquid 11 to minor liquid distribution channels 55-58. The minor liquid distribution channel 32 is connected to minor liquid distribution channels 55 and 56 to a liquid storage site 62P. In this example, the liquid storage site 62P is shown as a liquid retention pond 64P but it should be understood that the liquid storage site 62P may take other forms such as liquid retention tanks, liquid retention reservoirs and the like.

The liquid storage site 62P provides a storage area for excess liquid 11 from the liquid distribution system 10. The minor liquid distribution channel 56 is connected through a controllable user valve 66P to the liquid storage site 62P. The minor liquid distribution channel 56 and the controllable user valve 66P provide an input to the liquid storage site 62P from the liquid distribution system 10.

The liquid storage site 62P is connected through a controllable user valve 67P and a pump 68P to the minor liquid distribution channel 55. The pump 68P, the controllable user valve 67P and the minor liquid distribution channel 55 provide an output from the liquid storage site 62P into the liquid distribution system 10. Preferably, a liquid monitor 55M comprising a liquid level monitor 55L is connected to a remote telemetry unit 55X for communicating a signal output from the liquid level monitor 55L to the liquid provider 12 regarding the liquid level of the liquid storage site 62P to the liquid provider 12.

The minor liquid distribution channel 57 provides the liquid 11 to a user irrigation system 64Q through a controllable user valve 66Q to a recreational site 62Q. In this example, the recreational site 62Q is shown as golf course. The operation of the user irrigation system 64Q and the controllable user valve 66Q will be described in greater detail with respect to FIGS. 5-9.

The minor liquid distribution channel 58 provides the liquid 11 to user irrigation systems 64R-64U through controllable user valves 66R-66U to industrial sites 62R-62U. In this example, the industrial sites 62R-62U are shown as a commercial or an industrial park.

Referring back to FIG. 1, the present invention includes a control 70 comprising a liquid provider control 71 and a user control 72. Typically, the liquid provider control 71 is installed at the location at the liquid provider 11. The user control 72 is shown as a plurality of user controls 72A-72U located at selected one or more of the existing user sites 62A-62U shown in FIGS. 1 and 1A.

Each of the plurality of user controls 72A-72U replaces a conventional controller installed in the selected one or more of the existing user sites 62A-62U shown in FIGS. 1 and 1A. In this example, user controls 72A-72U have been shown installed on all user irrigation systems 64A-64U of the user sites 62A-62U but it should be understood that the user controls 72A-72U may be installed on only some of the user sites 62A-62U.

The liquid provider control 71 and the plurality of user controls 72A-72U are interconnected by a communication connection 80 comprising a provider communication connection 81 communicating with a user communication connection 82. The user communication connection 82 is shown as a plurality of user communication connection 82A-82U located at selected one or more of the existing user sites 62A-62U shown in FIGS. 1 and 1A.

The communication connection 80 may be a wireless connection, a wire connection or an optical connection. The provider communication connection 81 may comprises a provider transmitter or transceiver. The provider communication connection 81 may incorporate a satellite connection, mesh network, a repeater provider communication connections 81. Each of plurality of user communication connections 82A-82U comprises a plurality of user receivers or transceiver. The plurality of user communication connection 82A-82U may incorporate a satellite connection, mesh network, a repeater user communication connections 82.

As will be described in greater detail hereinafter, the liquid provider control 71 communicates with the plurality of user controls 72A-72U to override the operation of selected controllable user valves 66A-64U located at the user sites 62A-62U. The override of the selected controllable user valves 66A-64U enables the liquid provider control 71 to maintain the liquid flow, the liquid level and/or liquid pressure in the channels 20, 31-32 and 51-54.

Figure 2:
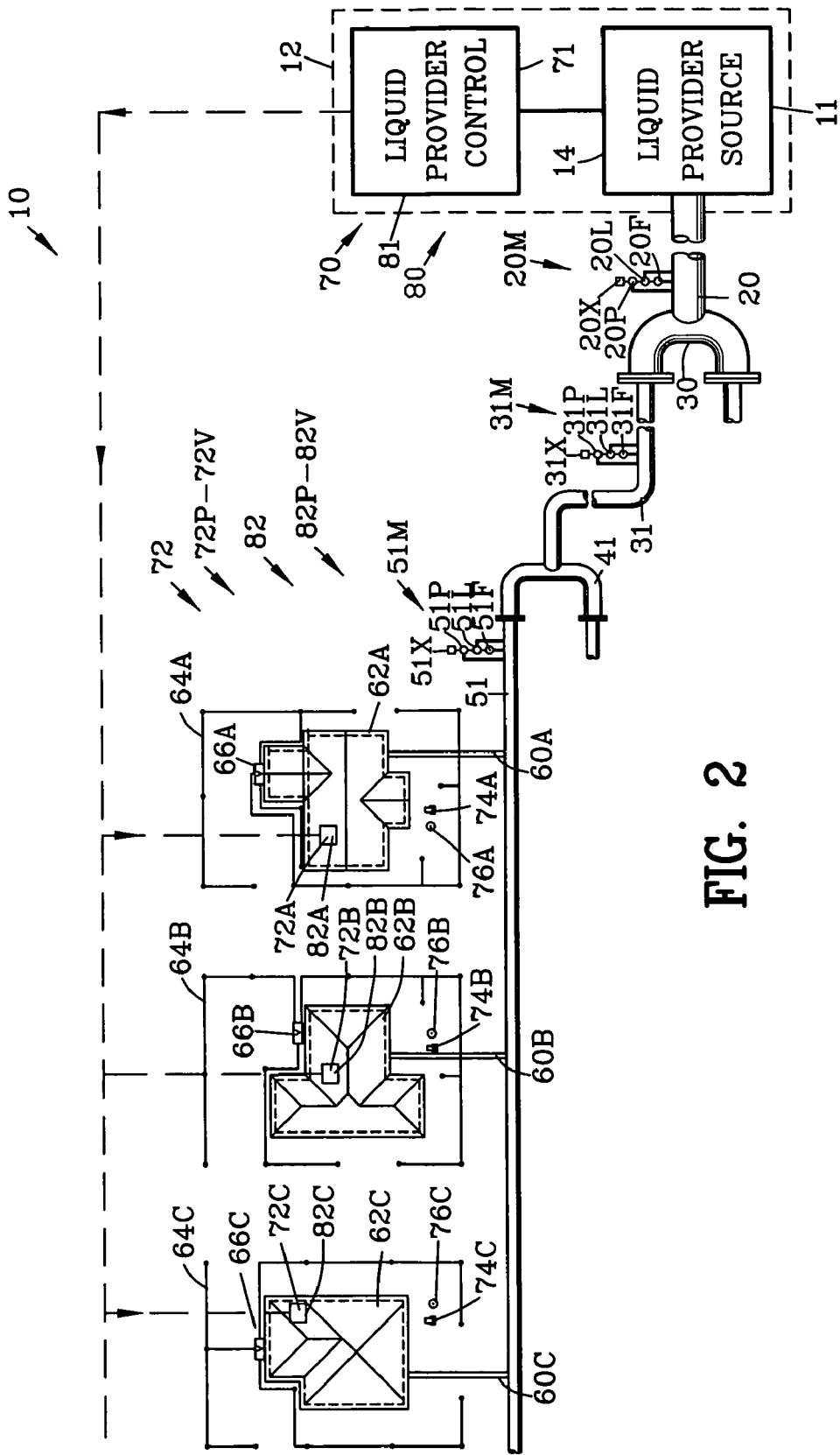
FIG. 2 is an enlarged view of a portion of FIG. 1.

FIG. 2 is an enlarged view of a portion of FIG. 1 illustrating user controls 72A-72C for receiving signals transmitted by the liquid provider control 71. The user controls 72A-72C operate the controllable user valves 66A-64C to discontinue or interrupt the user irrigation systems 64A-64C upon an appropriate signal from the liquid provider control 71. The liquid provider control 71 provides an appropriate signal to selected plurality of user controls 72A-72C to discontinue or interrupt the user irrigation systems 64A-64C upon the detection of a low liquid flow, a low liquid level and/or a low liquid pressure in the channels 20, 31-32 and 51-58. In the alternative, the liquid provider control 71 provides an appropriate signal to selected plurality of user controls 72A-72C to actuate the user irrigation systems 64A-64C upon the detection of a high liquid flow, a high liquid level and/or a high liquid pressure in the channels 20, 31-32 and 51-58. In a further alternative, the liquid provider control 71 provides an appropriate signal to selected plurality of user controls 72A-72C to lock out operation of the user irrigation systems 64A-64C in accordance with an environmental or governmental scheduled or managed irrigation program. It should be appreciated that the liquid provider control 71 only operates to control selective ones of the plurality of user controls 72A-72U to discontinue or actuate the user irrigation systems 64A-64U that incorporate a user control 72 of the present invention.

Figure 3:
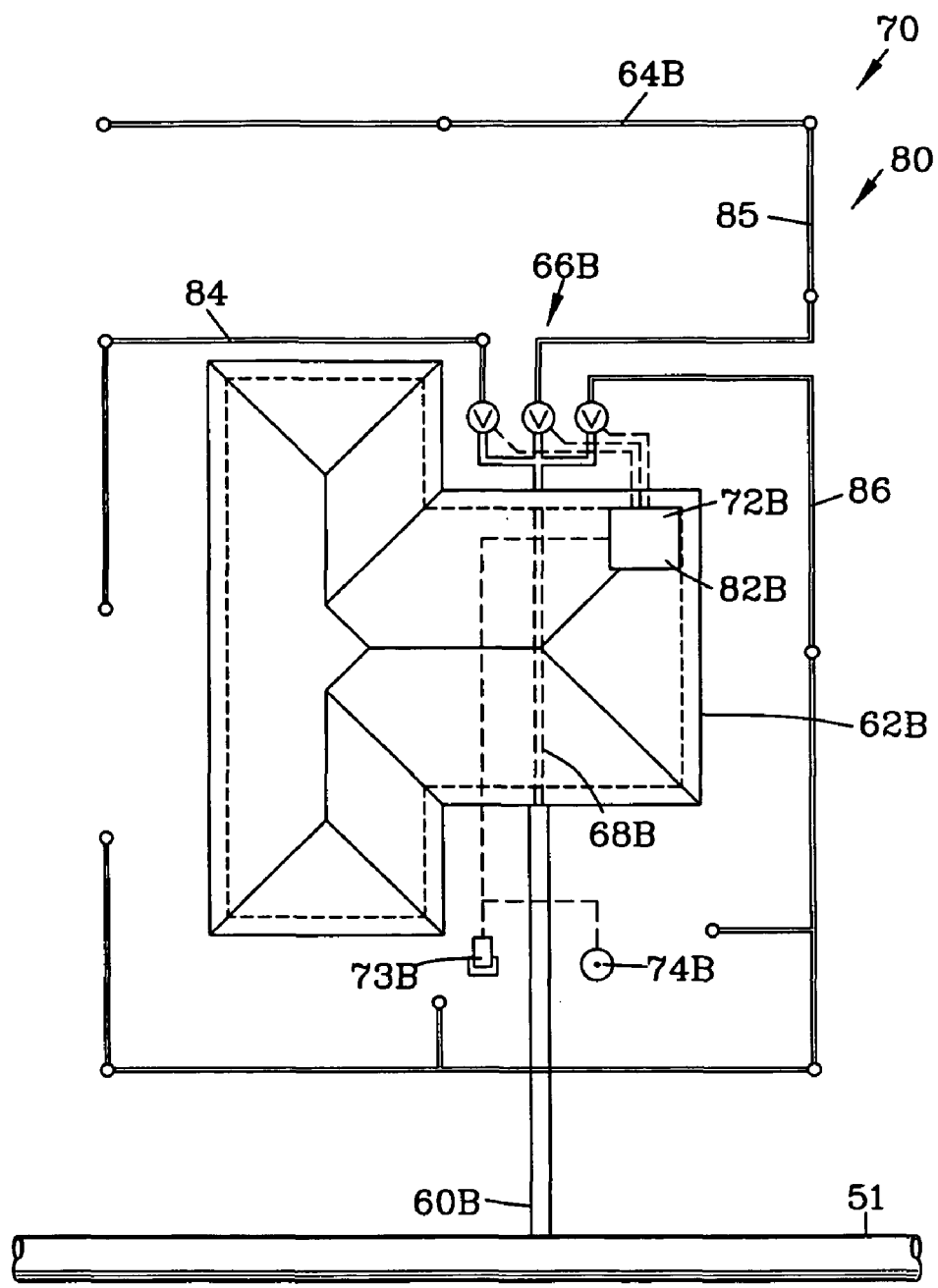
FIG. 3 is a magnified view of one user sites of FIG. 2.

FIG. 3 is a magnified view of one of the user site 62B of FIG. 2. The user channel 60B feeds an irrigation channel 68B to provide liquid 11 to the controllable user valves 66B. The controllable user valves 66B provide liquid 11 to three zones 84-86 of the user irrigation systems 64B. The controllable user valves 66B are operated by the user control 72B of the present invention. The user control 72B of the present invention has been installed in place of a conventional controller. Preferably, the user control 72B of the present invention includes all of the programmable features of a conventional controller with the addition of the user communication connections 82B for communication with the provider communication connection 81. An optional rain gauge 73B and a moisture sensor 74B have been connected to provide inputs to the user control 72B.

Figure 4:
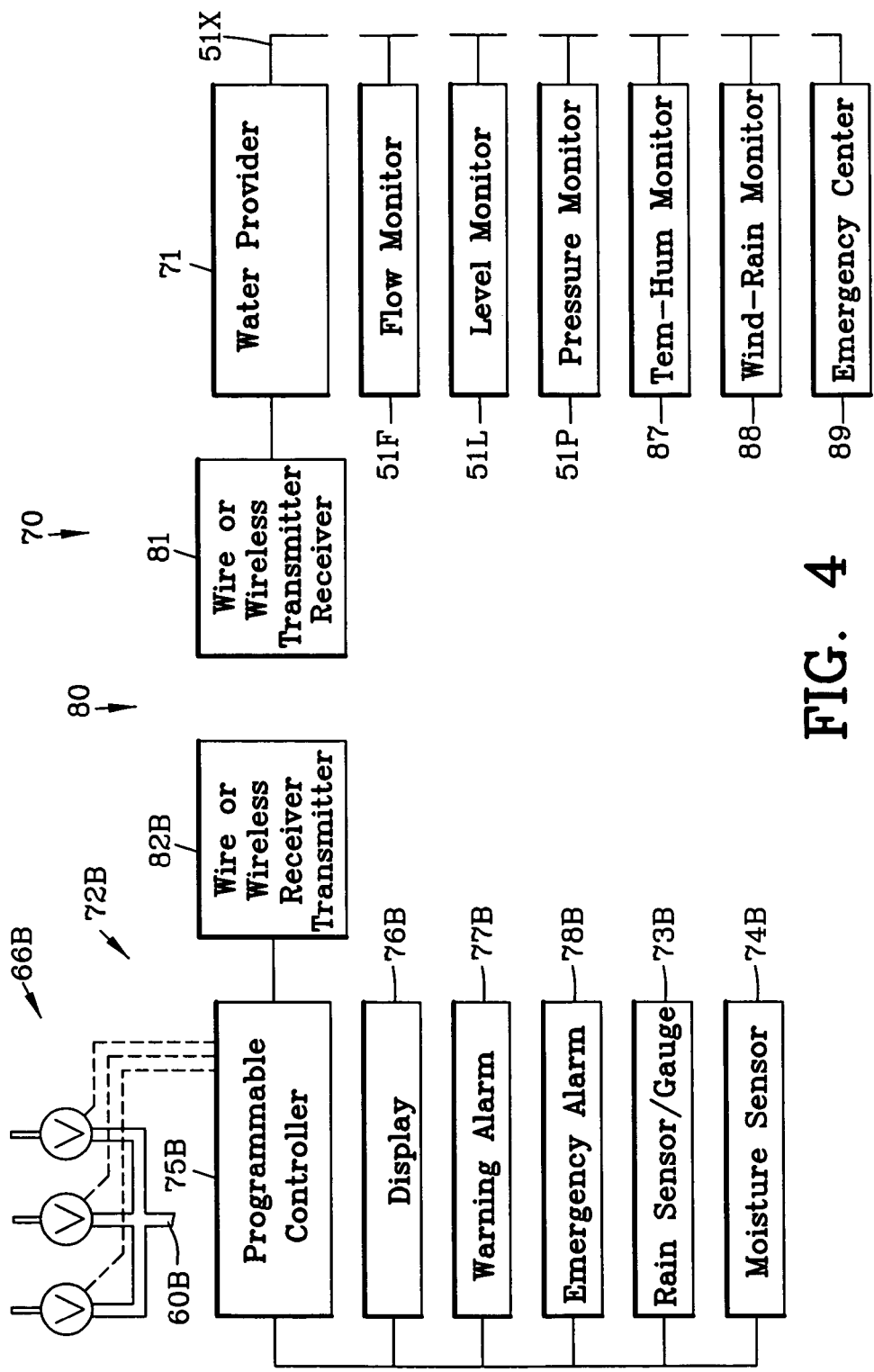
FIG. 4 is a block diagram of a control of the present invention located in the user site of FIG. 3.

FIG. 4 is a block diagram of the control 70 of the present invention illustrating the liquid provider control 71 and the user control 72B shown in FIG. 3. The liquid provider control 71 is connected to the provider communication connection 81 whereas the user control 72B is connected to user communication connection 82B for enabling communication therebetween. Preferably, the provider communication connection 81 includes a transmitter and a receiver whereas the user communication connection 82B includes a receiver and a transmitter.

The liquid provider control 71 is connected to the liquid flow monitor 51F, the liquid level monitor 51L and the liquid pressure monitor 51P through either a wire connection or a wireless connection 70C. The liquid provider control 71 may be connected to a temperature and humidity monitor 87 and a wind and rain monitor 88. Optionally, the liquid provider control 71 may be connected to an emergency center 89 such as an emergency center, a homeland security center, a weather center, home security, smart home systems and the like.

The user control 72B comprises a programmable controller 75B and a display 76B. The display 76B may be a touch screen for programming the programmable controller 75B. In the alternative, the programmable controller 75B may be programmed through conventional keys or through a communication with an external computer. In addition, the programmable controller 75B may be programmed remotely by the liquid provider control 71.

The programmable controller 75B may be programmed in a conventional manner to control the operation of the controllable user valves 66B. The programmable controller 75B may be programmed for date and time of irrigation, sequential and/or multiple zone irrigation, compensation for past and present rain fall, compensation for soil moisture content and compensation for atmospheric temperature and humidity.

The liquid provider control 71 may be connected to the optional rain sensor 73B and/or the optional moisture sensor 74B as shown in FIG. 3. The programmable controller 75B alters a pre-established program irrigation schedule based on rain fall as measured by the rain sensor 73B and/or the soil moisture content as measured by the moisture sensor 74B. An optional warning alarm 77B may be provided to alert persons at the user site of various malfunctions relating to the user irrigation system 64B. In a further option, the user controls 72B is shown connected to an emergency alarm 78B.

The user communication connection 82B receives signals from the provider communication connection 81 of the liquid provider control 71 to override the operation of the programmable controller 75B. The signals from the provider communication connection 81 provide additional inputs to the programmable controller 75B to alter, modify or override the operation of the programmable controller 75B. The signals from the provider communication connection 81 may actuate and/or deactivate the controllable user valves 66B. In addition, the signals from the provider communication connection 81 actuate an optional emergency alarm 78B to alert persons at the user site of emergencies from an emergency center such as a homeland security center, a weather center and the like. The user liquid provider control 72B may provide information to the liquid provider control 71 regarding the operation and the data collected by the user provider control 72B. Data collected from the user provider control 72B may include any of the information present at the programmable controller 75B including evapotranspiration (ET) data, precipitation data, meteorological data, ground moisture data, watering data, alarm data and the like.

A control system 70 shown in FIGS. 1-4 operates in the following manner. Under normal operating conditions, the liquid 11 flows from the liquid provider 12 through the major liquid distribution channel 20 and manifolds 41 and 42 into the local liquid distribution channels 51-54 shown in FIG. 1. In addition, the liquid 11 flows from the liquid provider 12 into the local liquid distribution channels 55-58 shown in FIG. 1A. The liquid provider control 71 monitors the liquid monitors 20M, 31M, 32M, 51M-55M for insuring a proper operating liquid flow condition exits in the local liquid distribution channels 51-58.

In the event a proper operating liquid flow condition exits in the local liquid distribution channels 51-58, then liquid provider control 71 will permit the plurality of user controls 72A-72U to operate in an uninhibited manner. Each of the plurality of user controls 72A-72U operates controllable user valve 66A-66U for irrigating the respective tracks of land 62A-62U in accordance with the programs of the respective one of the plurality of user controls 72A-72U.

In the event an operating liquid flow condition exits in one of the local liquid distribution channels 51-58, then liquid provider control 71 will generate a signal to override selected ones of the plurality of user controls 72A-72U. For example, in the event the liquid monitor 51M detects a low liquid flow or a low liquid level and/or a low liquid pressure in the local liquid distribution channel 51, then the liquid provider control 71 generates signals to override selected ones of the plurality of user controls 72A-72D for closing the respective controllable user valve 66A-66D irrigating the respective tracks of land 62A-62D. The closing of selected ones of the controllable user valve 66A-66D reduces the liquid use flowing from local liquid distribution channel 51 thus restoring the low liquid flow or the low liquid level or the low liquid pressure in the local liquid distribution channel 51. The closing of selected ones of the controllable user valve 66A-66D interrupts the normal operation of the selected ones of the plurality of user controls 72A-72D.

After the liquid flow or liquid level and/or liquid pressure in the local liquid distribution channel 51, returns to the desired level, the liquid provider control 71 will open the interrupted plurality of controllable user valves 66A-66D to continue normal operation of the user irrigation systems 64A-64D. The programmable controller 75B will continue the remainder of the operation cycle after being interrupted by the liquid provider control 71 to provide the proper time for irrigation after the delay caused by the closing of the controllable user valves 66A-66D by the liquid provider control 71.

In the event the liquid monitor 54M detects a low liquid flow or a low liquid level and/or a low liquid pressure in the local liquid distribution channel 54, then the liquid provider control 71 generates signals to override selected ones of the plurality of user controls 72M-72O for closing the respective controllable user valve 66M-66O irrigating the respective user sites 62M-62O. The closing of selected ones of the controllable user valve 66M-66O reduces the liquid use emanating from local liquid distribution channel 54 thus restoring the low liquid flow or the low liquid level or the low liquid pressure in the local liquid distribution channel 54.

In the event the closing of the selected controllable user valve 66M-66O does not restore the low liquid flow or the low liquid level or the low liquid pressure in the local liquid distribution channel 54, then the liquid provider control 71 generates signals to actuate pump 68P and open valve 67P to pump liquid from the liquid storage site 62P to restore the low liquid flow or the low liquid level or the low liquid pressure in the liquid distribution channel system 10.

In the event any of the liquid monitors 20M, 31M, 32M, 51M-55M detects a high liquid flow or a high liquid level and/or a high liquid pressure in the liquid distribution channel system 10, then the liquid provider control 71 generates signals to open valve 66P to direct excess liquid from the liquid distribution channel system 10 into the liquid storage site 62P. The flow of excess liquid from the liquid distribution channel system 10 into the liquid storage site 62P reduces the high liquid flow or the high liquid level and/or the high liquid pressure in the liquid distribution channel system 10. The liquid level of the liquid storage site 62P is relayed to the liquid provider control 71 by the liquid monitor 55M to terminate the filling of the liquid storage site 62P upon obtaining a desired liquid level. In the alternative, the liquid provider control 71 may generate signals to open selected ones of valves 66A-66O and/or 66Q-66U to direct excess liquid from the liquid distribution channel system 10 into the user sites 66A-66O and/or 66Q-66U.

Figure 5:
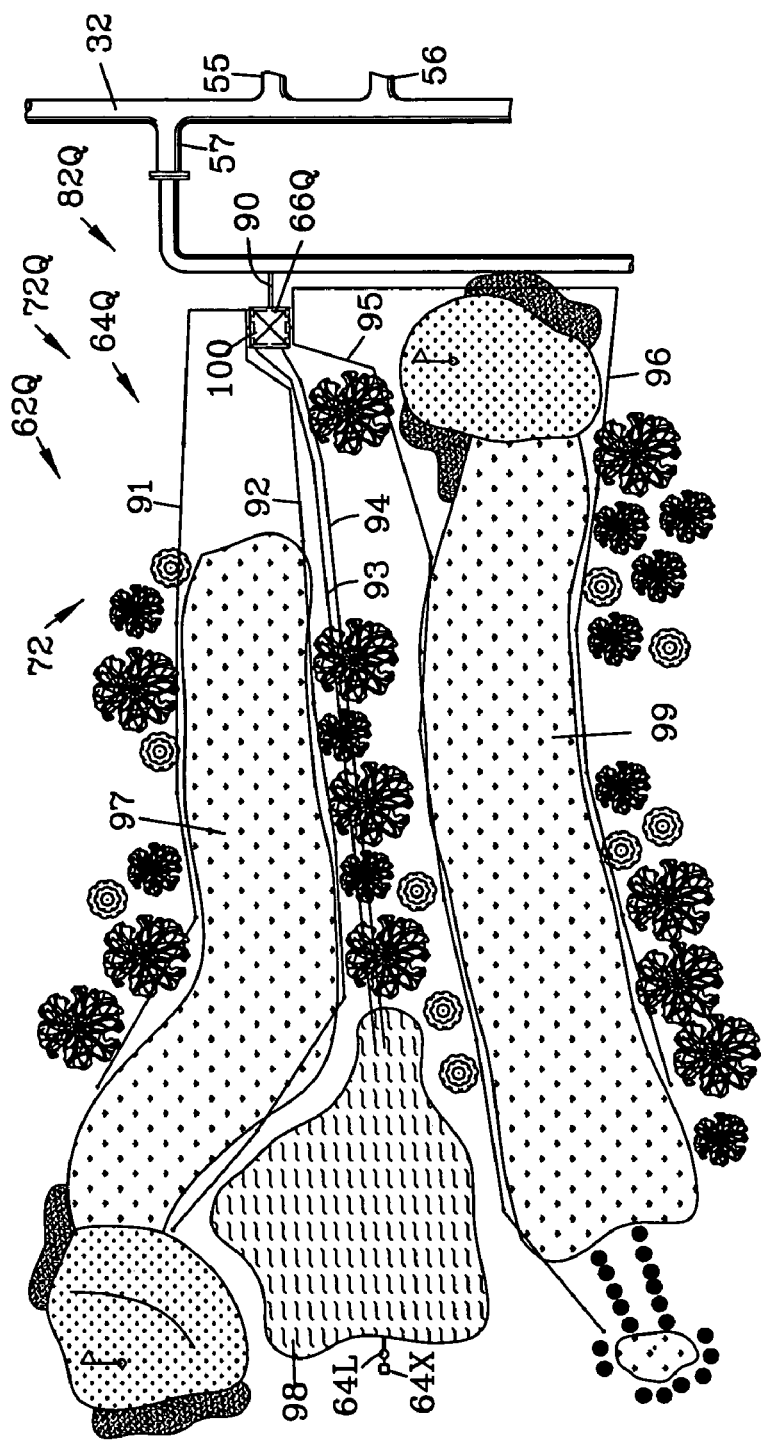
FIG. 5 is an enlarged view of a portion of FIG. 1A
Figure 6:
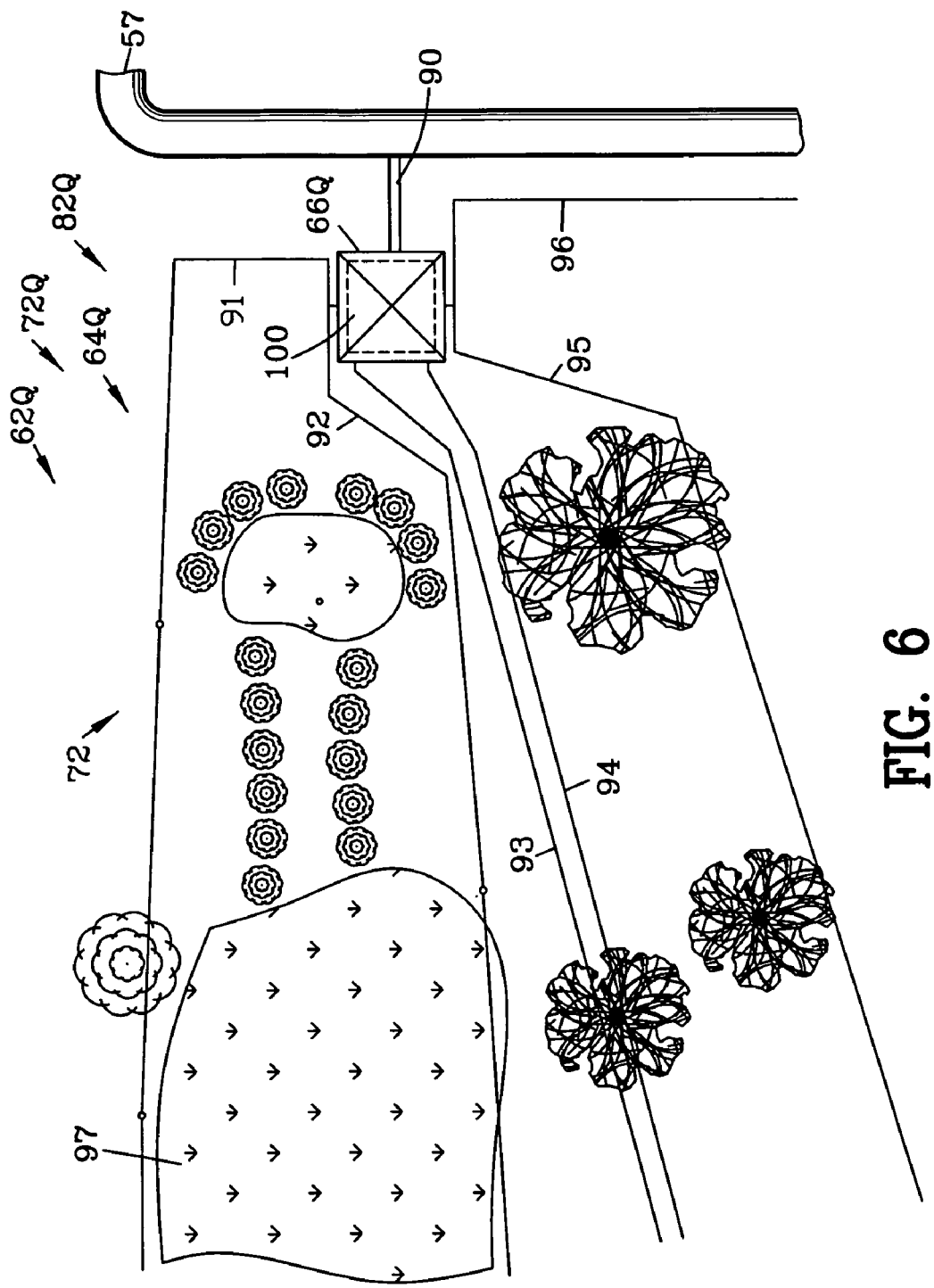
FIG. 6 is a magnified view of a portion of FIG. 5.

FIG. 5 is an enlarged view of a portion of FIG. 1A with FIG. 6 being a magnified view of a portion of FIG. 5. The controllable user valve 66Q directs the liquid 11 from the minor liquid distribution channel 57 through conduit 90 to the user irrigation system 64Q of the golf course recreational site 62Q. The user irrigation system 64Q includes irrigation zones 91 and 92 adjacent fairway 97 and irrigation zones 95 and 96 adjacent fairway 99. Conduits 93 and 94 interconnect the controllable user valve 66Q to a private liquid retention pond 98. The private liquid retention pond 98 includes a liquid level sensor 64L and a remote telemetry unit 64X. Optionally, the liquid retention pond 98 may include liquid pressure monitor and/or a liquid flow monitor (not shown).

Figure 7:
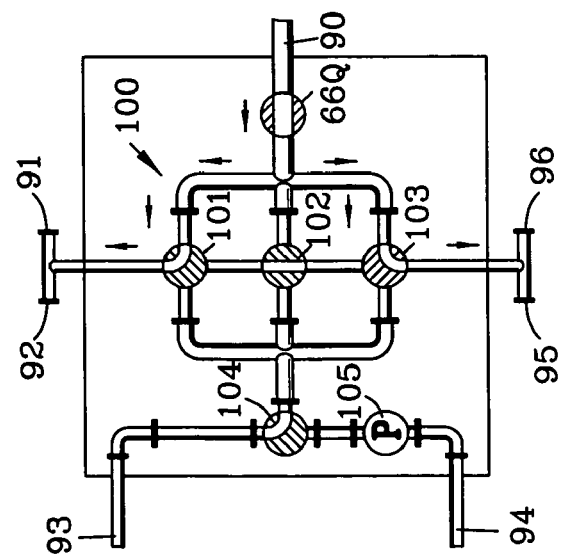
FIG. 7 is a diagram of a valve system of FIG. 6 disposed in a first position.
Figure 14:
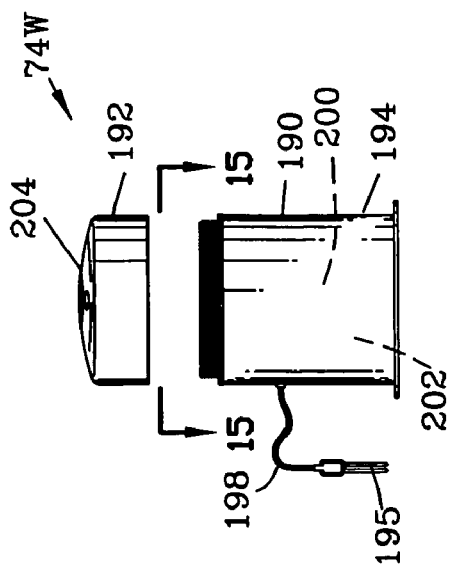
FIG. 14 is an exploded view of the moisture sensor of FIG. 12 removed from the ground surface.
Figure 15:
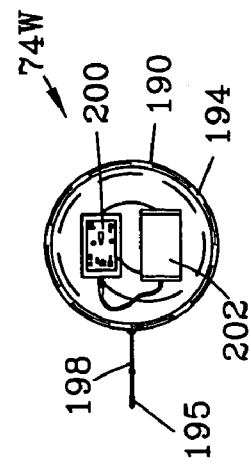
FIG. 15 is a view along line 15-15 in FIG. 14.
Figure 13:
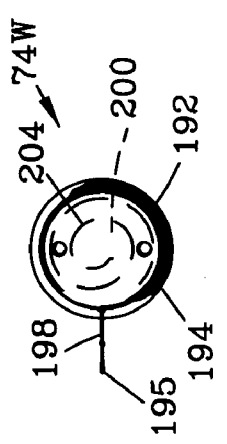
FIG. 13 is a top view of FIG. 12.
Figure 12:
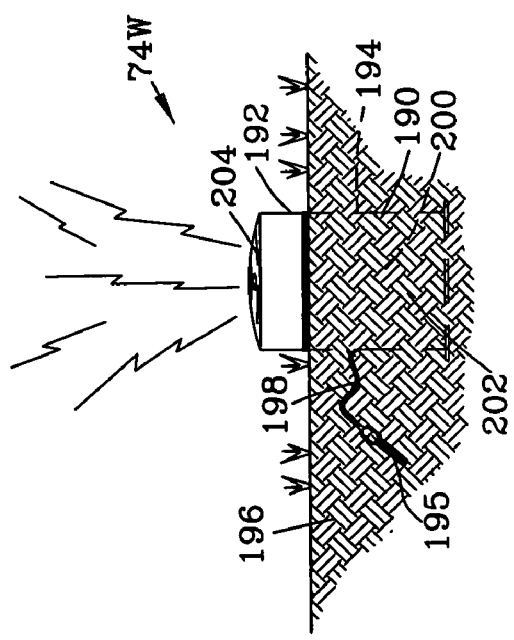
FIG. 12 is an enlarged side view of an example of a moisture sensor suitable for use with the present invention located in a ground surface.

FIG. 7 is a diagram of a valve system of FIG. 6 interconnecting the minor liquid distribution channel 57 through conduit 90 to the irrigation zones 91, 92, 95 and 96 and to the conduits 93 and 94. The controllable user valve 66Q receives the liquid 11 from the minor liquid distribution channel 57 through the conduit 90. A valve matrix 100 comprises valves 101-104 directing the liquid 11 from the controllable user valve 66Q to conduits 91-96. A pump 105 is interposed between the conduit 94 and valve 104.

During normal operation of the control system 70, the liquid 11 from the minor liquid distribution channel 57 flows through conduit 90 and the controllable user valve 66Q and valves 101 and 103 to irrigate irrigation zones 91 and 92 adjacent fairway 97 and irrigation zones 95 and 96 adjacent fairway 99.

Figure 8:
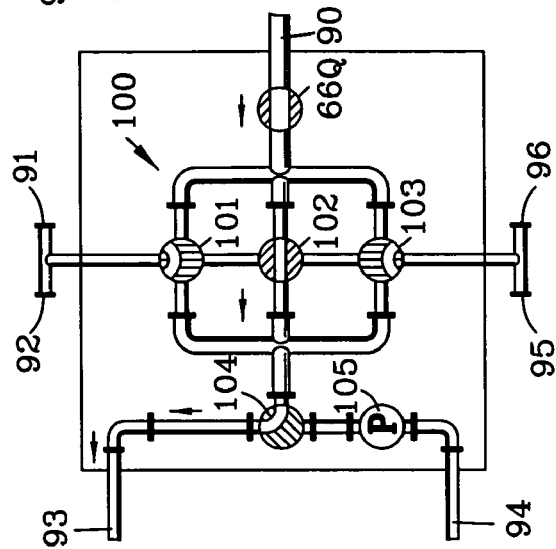
FIG. 8 is a view of the valve system of FIG. 7 disposed in a second position.

FIG. 8 illustrates the valves 101-104 positioned to direct the liquid 11 from the minor liquid distribution channel 57 to fill the private liquid retention pond 98. During normal operation of the control system 70 or during an excess of liquid in the liquid distribution channel system 10, the liquid 11 from the minor liquid distribution channel 57 may be directed to fill the private liquid retention pond 98.

Figure 9:
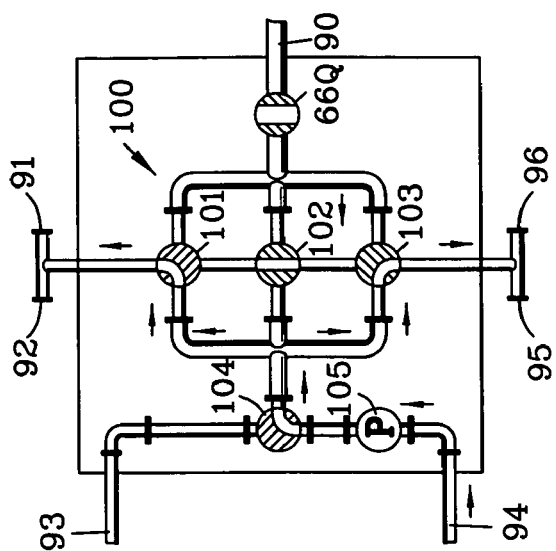
FIG. 9 is a view of the valve system of FIG. 7 disposed in a third position.

FIG. 9 illustrates the valves 101-104 positioned to pump the liquid 11 from the private liquid retention pond 98 into the irrigation zones 91 and 92 adjacent fairway 97 and irrigation zones 95 and 96 adjacent fairway 99. In the event the liquid provider control 71 generates signals to close the user controls 66Q, the recreational site 62Q may be irrigated from the private liquid retention pond 98. In contrast to the liquid storage site 62P, the liquid retention pond 98 is a private reservoir and is controlled and operated by the owners of the recreational site 62Q. It should be appreciated by those skilled in the art that valves 606Q and 104 may be simultaneously opened to provide water from both the conduit 90 and from the private liquid retention pond 98 through conduits 93 and 94 into the irrigation zones 91 and 92.

FIGS. 10 and 11 are top and side views of a second example of a liquid distribution system 110A for regulating the flow of a liquid 111 by a water management provider 112 controlling a natural water source 114. In this example, the liquid distribution system 110 controls a major liquid distribution channel 120 shown as a creek, a stream, a river or an irrigation channel.

The liquid 111 is directed from the major distribution channel 120 to minor distribution channels 131-133 show as irrigation channels or irrigation conduits. Each of the minor distribution channels 131-133 includes a liquid monitor 131M-133M connected to a remote telemetry unit 131X-133X. Each of the liquid monitors 131M-133M comprises a liquid level monitor 131L-133L.

The minor distribution channels 131-133 provide liquid flow to a multiplicity of users sites 162A-162C that are representative of tracts of land having an agricultural land uses. Each of the user sites has a user irrigation system 1MA-164C controlled by controllable user valve 166A-166C for irrigating the respective tracks of land 162A-162C. The controllable user valves 166A-166C provide liquid 11 to rotary irrigators 169A-169C for irrigating crops in the respective tracks of land 162A-162C.

A control 170 comprises a liquid provider control 171 and a plurality of user controls 172A-172C. The plurality of user controls 172A-172C are located at the existing user sites 162A-162C. Each of the plurality of user controls 172A-172C is similar to the user control 72B show in FIG. 4. The user controls 172A-172C have been shown installed on all user irrigation systems 164A-164C of the user sites 162A-162C but it should be understood that the user controls 172A-172C maybe installed on only some of the user sites 162A-162C.

The liquid provider control 171 and the plurality of user controls 172A-172C are interconnected by a communication connection 180 comprising a provider communication connection 181 communicating with a plurality of user communication connections 182A-182C.

The remote telemetry units 131X-133X communicates with the water management provider 112 through the communication connection 180 to relay the signal output from the liquid level monitors 131L-133L regarding the liquid level within the minor liquid distribution channels 131-133.

The liquid provider control 171 communicates with the plurality of user controls 172A-172C to override the operation of selected controllable user valves 166A-164C located at the user sites 162A-162C. The override of the selected controllable user valves 166A-164C enables the liquid provider control 171 to maintain the liquid level in the major distribution channel 120 to minor distribution channels 131-133.

FIGS. 12-15 are various views of an example of a moisture sensor 74W suitable for use with the present invention. In this example, the moisture sensor 74W comprises a container 190 sealing with a closure 192 to form a water-tight enclosure 194. A moisture sensor probe 195 is inserted within a ground surface 196 of the user sites 62. The moisture sensor probe 195 is connected by a conductor 198 to a wireless transmitter 200 located within the water-tight enclosure 194. Preferably, a battery power supply 202 is located within the water-tight enclosure 194 for operating the wireless transmitter 200. In the alternative, conventional secondary power may be used for operating the wireless transmitter 200.

An antenna 204 is connected to the wireless transmitter 200 to transmit a wireless signal representative of the moisture content of the ground surface 196 of the user sites 62. A compatible wireless receiver. (not shown) is located proximate to the respective user sites 62. A series of moisture sensors 74W may be arranged in a pattern to enable the series of moisture sensors 74W to act as repeaters, a mesh array or the like for eliminated the need for a wire system. For, example, series of moisture sensors 74W may be arranged along the fairways 97 and 99 for eliminated the need for an underground wire system. One of the series of moisture sensors 74W may function as an end point.

Figure 16:
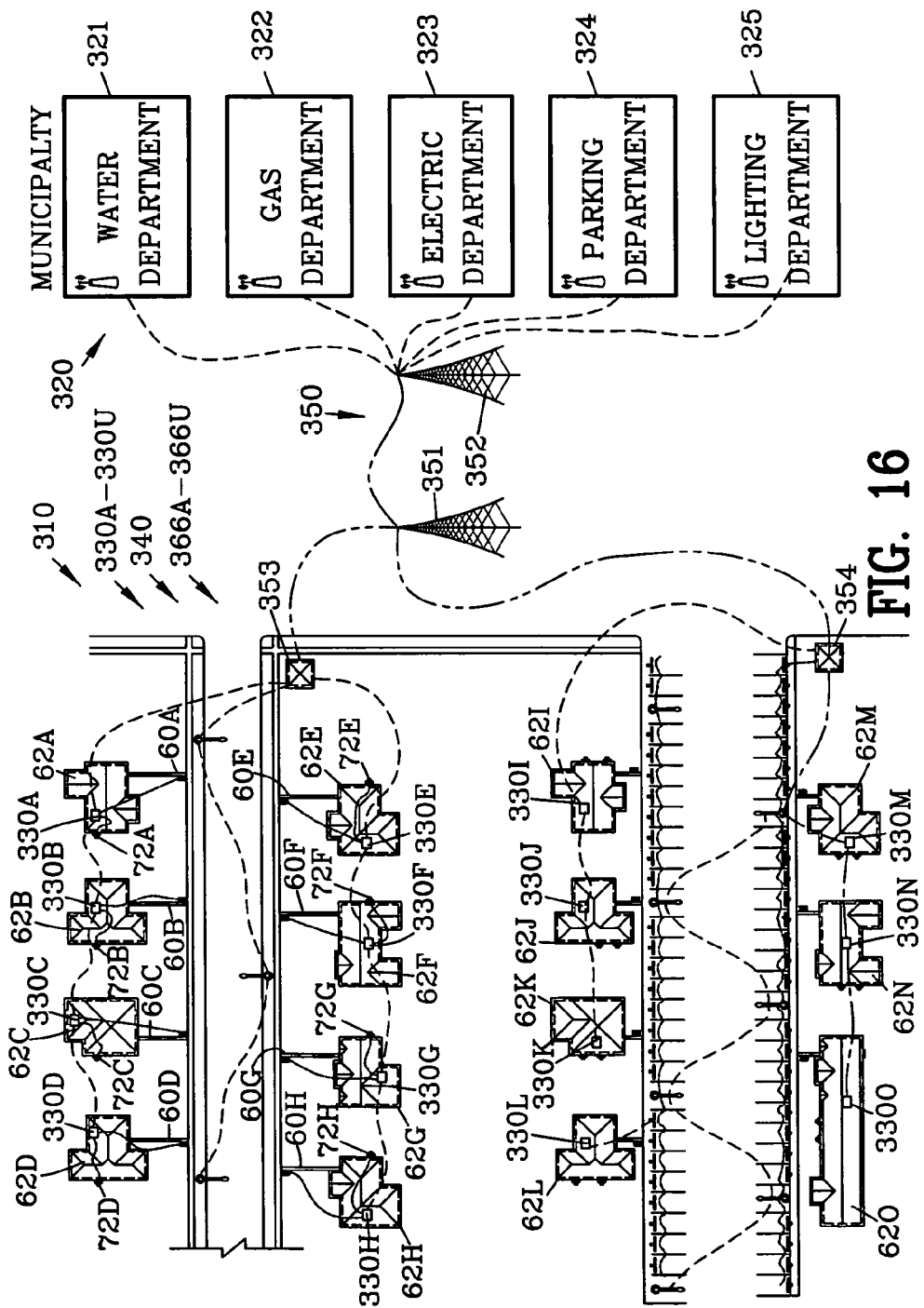
FIG. 16 is a top view of a first example of a communication system incorporating the present invention.

FIG. 16 is a view similar to FIG. 1 illustrating the liquid distribution system 10 in combination with a communication system 310 of the present invention. The liquid distribution 10 is shown in FIGS. 1-15 and the communication system 310 shown in FIGS. 16-18. As previously described, the distribution system 10 regulates the flow of the liquid 11 from the liquid provider 12 to the user sites 62A-62U. In this example, the liquid provider 12 is shown as a municipal water department.

Figure 17:
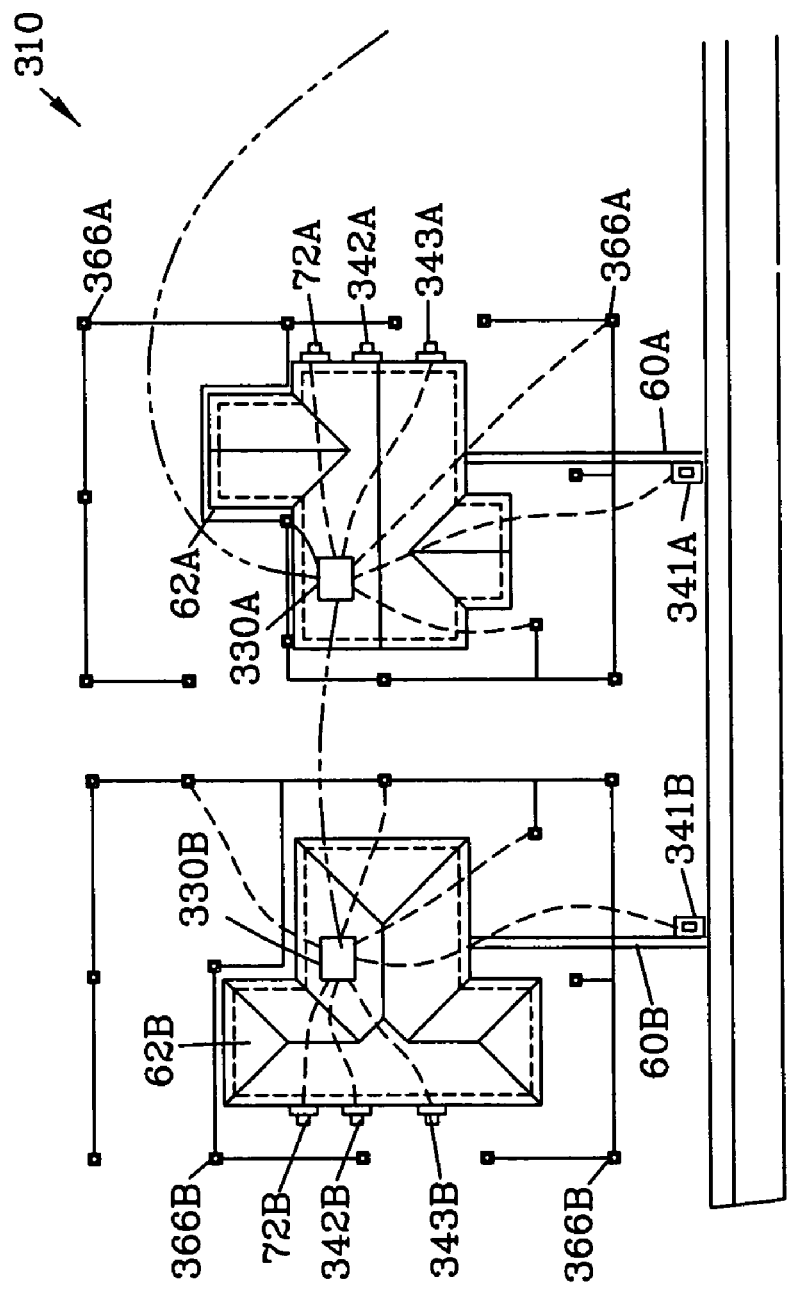
FIG. 17 is a magnified view of a first portion of FIG. 16.
Figure 18:
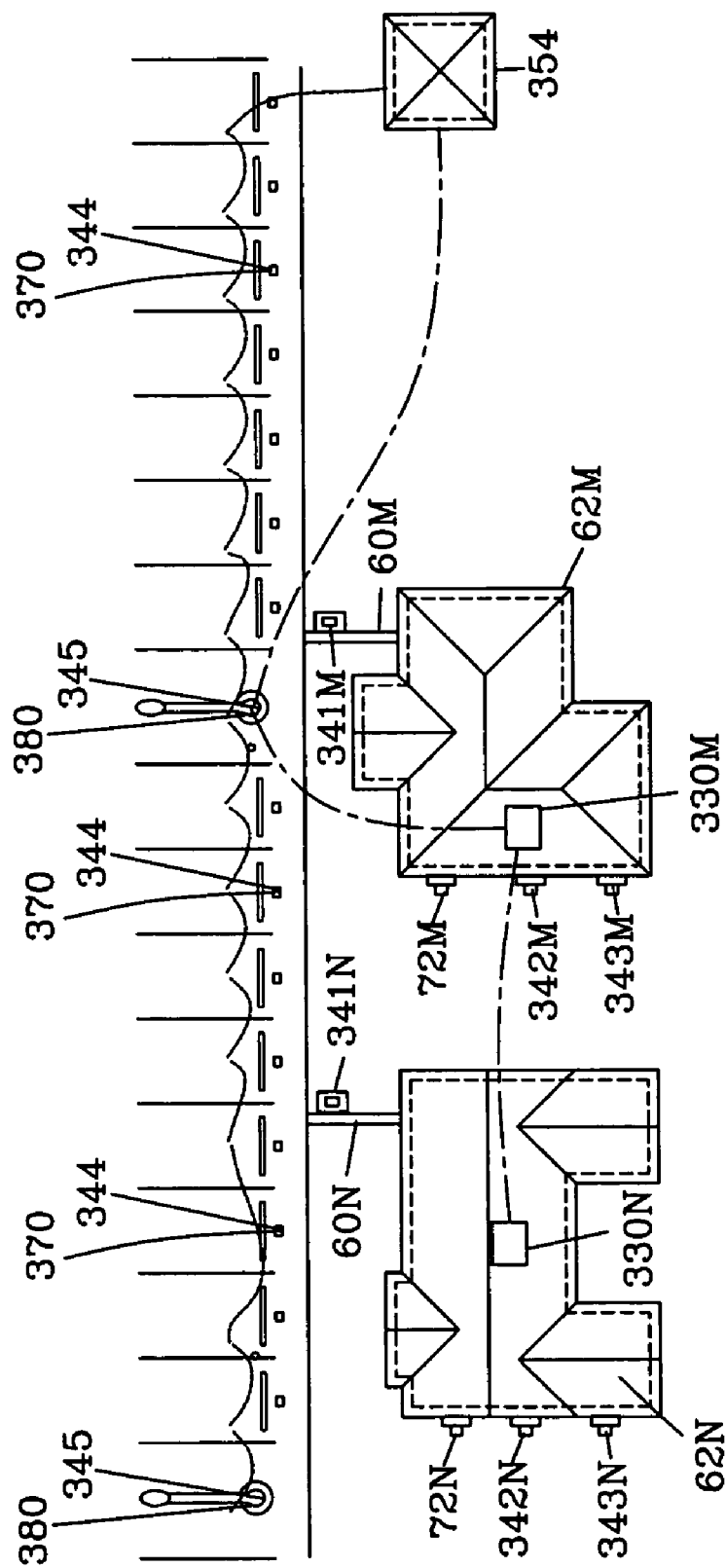
FIG. 18 is a magnified view of a second portion of FIG. 16.

The communication system 310 shown in FIGS. 16-18 provides wireless network between adjacent user sites 62A-62U for communicating information. The communication system 310 operates in concert with the distribution system 10.

The communication system 310 comprises a plurality of provider wireless transceivers 320 including a municipal water transceiver 321. The municipal water transceiver 321 communicating with the multiplicity of user wireless transceivers 330A-330U in each of the multiplicity of user channels 60A-60U, respectively. Each of the multiplicity of user wireless transceivers 330A-330U is connected to wireless sprinkler valves 366A-366U in each of the user sites 62A-62U.

The municipal water transceiver 321 communicates with selected ones of the multiplicity of user wireless transceivers 330A-330U for changing selective ones of the wireless sprinkler valves 366A-366U of the multiplicity of independent users sites 62A-62U upon selected ones of the municipal water provider 12 sensing an undesired liquid flow characteristic within the major and minor liquid distribution channels for restoring a desired water flow characteristic within the water distribution channels as described heretofore. An example of a suitable wireless sprinkler valve will be described hereinafter.

The provider wireless transceiver 320 includes a gas department wireless transceiver 322, an electric department wireless transceiver 323, a parking department wireless transceiver 324 and a lighting department wireless transceiver 325. The provider wireless transceivers 322-325 communicated with provider installation wireless transceivers 341-345. In addition, the wireless transceiver 320 includes may include a provider furnishing communication with a smart home system as well as monitors for storm and sanitary sewer systems.

The provider wireless transceiver 320 may incorporated repeater wireless transceivers 350 including repeater wireless transceivers 351-354 for interconnecting the provider wireless transceiver 320 to the multiplicity of user wireless transceivers 330A-330U and the provider installation wireless transceivers 341-345. In addition the wireless interconnection between the provider wireless transceiver 320 and the multiplicity of user wireless transceivers 330A-330U and the provider installation wireless transceivers 341-345 may employ a wire internet connection or a microware tower connection, a satellite connection or the like.

FIG. 17 is a magnified view of a first portion of FIG. 16 further illustrating the user wireless transceivers 330A and 330B and the provider installation wireless transceivers 341A-343A and 341B-343B.

The municipal water transceiver 321 communicates with the wireless transceivers 330A and 330B for changing the controllable user valves 366A and 366B of the users sites 62A and 62B upon municipal water transceiver 321 sensing an undesired liquid flow characteristic within the major and minor liquid distribution channels for restoring a desired water flow characteristic within the water distribution channels as described heretofore. The municipal water transceiver 321 may temporarily interrupt, delay or skip the irrigation cycle at the users sites 62A and 62B. In addition, the municipal water transceiver 321 communicates with the wireless water meter transceivers 341A and 341B for providing information to the municipal water transceiver 321 of the volume of water used by the user sites 62A and 62B.

The gas department transceiver 322 communicates with the gas meter wireless transceivers 342A and 342B for providing information to the gas department transceiver 322 of the volume of gas used by the user sites 62A and 62B.

The electric department transceiver 323 communicates with the electric meter wireless transceivers 343A and 343B for providing information to the electric department wireless transceiver 323 of the amount of electric city used by the user sites 62A and 62B.

FIG. 18 is a magnified view of a second portion of FIG. 16 further illustrating the user wireless transceivers 330M and 330N and the provider installation wireless transceivers 341-345. The user wireless transceivers 330M and 330N communicate with wireless sprinkler valves (not shown in FIG. 18) as well as the gas meter wireless transceivers 342M and 342N and the electric meter wireless transceivers 343M and 343N. The user wireless transceivers 330M and 330N communicate with parking meter wireless transceivers 344 and lighting installation wireless transceivers 345. The parking meter wireless transceivers 344 and the lighting installation wireless transceivers 345 provide information regarding the parking meters 370 and the street lights 380. The user wireless transceivers 330M and 330N may communicate with other third party wireless transceiver (not shown) such as rainfall gauges, soil moisture gages, weather stations, security alarms, smart hoe systems and the like. The wireless transceivers 330A-330U and the wireless transceivers 341-345 communicates with adjacent user wireless transceivers to form a wireless mesh network for transferring information unrelated to liquid flow from the user sites 62A-62U to third party provider wireless transceivers 320 for communicating. The dashed lines in FIGS. 16-18 are examples of the various communication paths in the mesh network.

Figure 19:
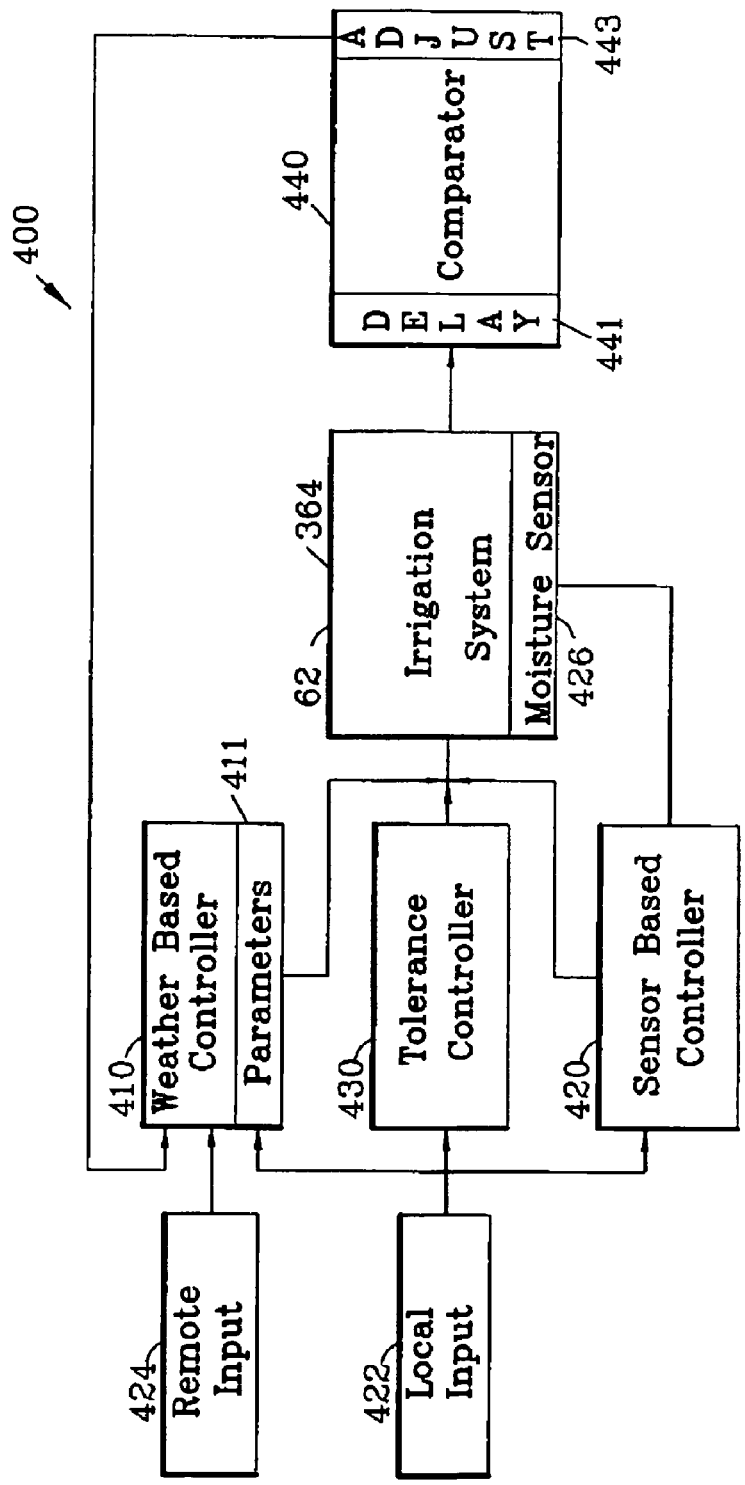
FIG. 19 is a block diagram of an adaptive weather based control and sensor based control for an irrigation system.

FIG. 19 is a block diagram of an adaptive control 400 for an irrigation system 364 to irrigate the user site 62. The adaptive control 400 comprises a weather based control 410 and sensor based control 420. The weather based control 410 is connected to the irrigation system 364 for watering the soil in the user site 62 in accordance with the user set parameters.

The weather based control 410 comprises a programmable memory 411 for storing user set parameters related to the environment and plant life to provide a desired moisture level in the soil in the user site 62. A local input device 422 enables a user to input user set parameters into the weather based control 410 and the sensor based control 420 and a tolerance control 430. An optional remote input device 424 enables parameters to be entered into the weather based control 410 and the sensor based control 420 and a tolerance control 430 from a remote location. A moisture sensor 426 senses an actual moisture level in the soil in the user site 62.

A comparator 440 compares the estimated moisture level in the soil of the user site 62 as predicted by the weather based controller 410 with the actual moisture level in the soil of the user site 62 as actually measured by the moisture sensor 426. Preferably, a delay 441 is provided for enabling the irrigation water to percolate through the soil to the moisture sensor 426.

The tolerance controller 430 provides an input to the comparator 440 of an acceptable limit of variation between the weather based controller 410 and the actual moisture level as measured by the moisture sensor 426. An adjustment 443 in the comparator 440 modifies the user set parameters to adjust the operation of the weather based controller 410 to be in accordance with the difference between the desired moisture level provided by the user set parameters and the actual moisture in the soil in the user site 62.

Figure 20:
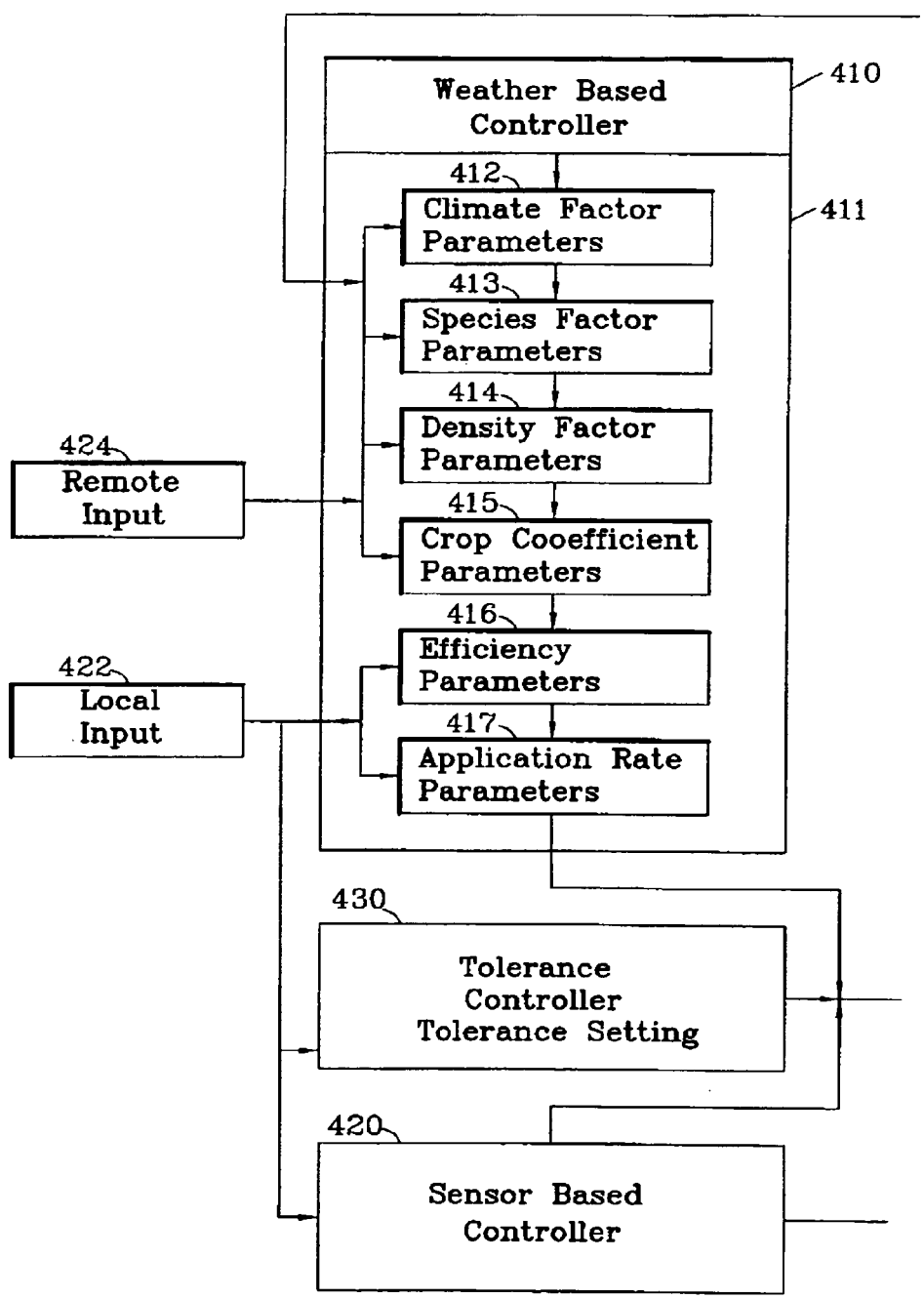
FIG. 20 is a block diagram of a first portion of FIG. 19.

FIG. 20 is a block diagram of a first portion of FIG. 19 illustrating the programmable memory 411 storing some of the user set parameters related to the environment and plant life. The illustrated user set parameters includes climate factors 412, species factors 413, density factors 414, crop coefficient 415, efficiency 416 and application rate 417. Many other parameters may also be included and the foregoing list of parameters should not be considered to be all-inclusive.

Figure 21:
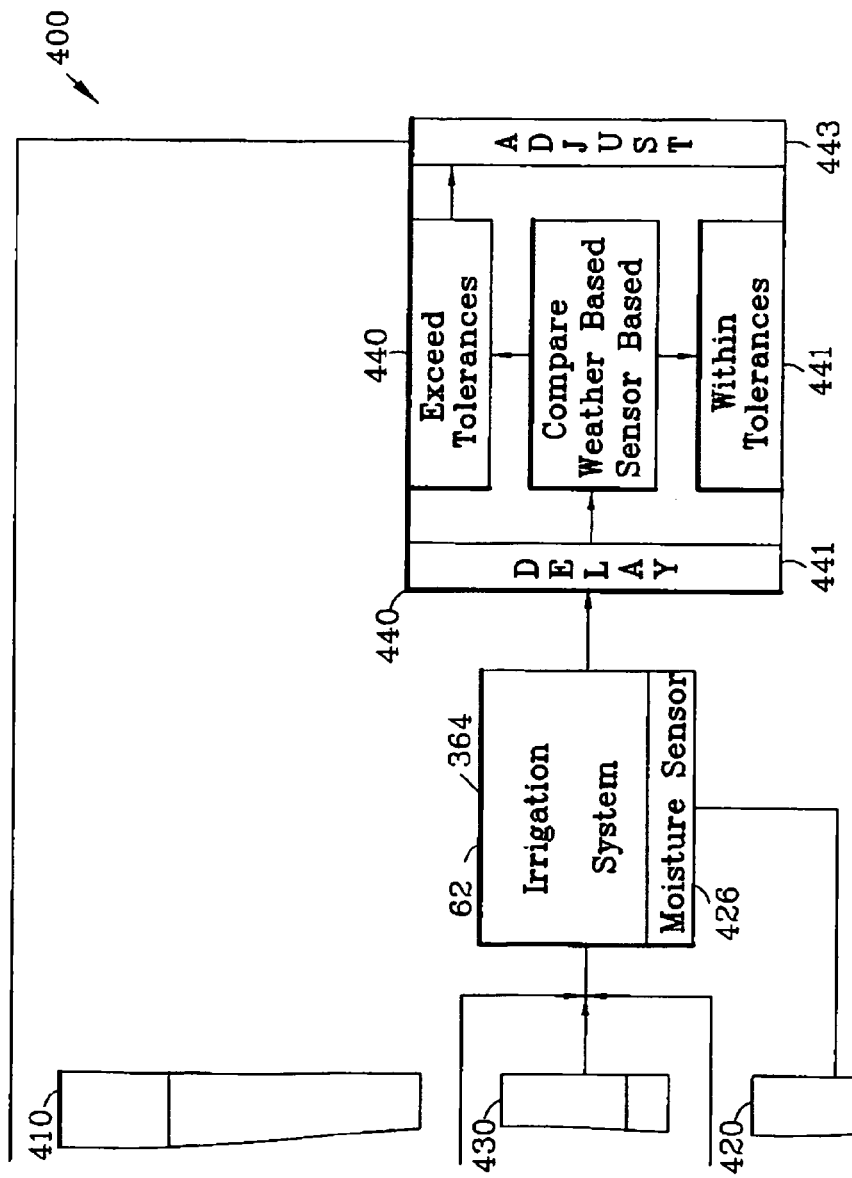
FIG. 21 is a block diagram of a second portion of FIG. 19.
Figure 22:
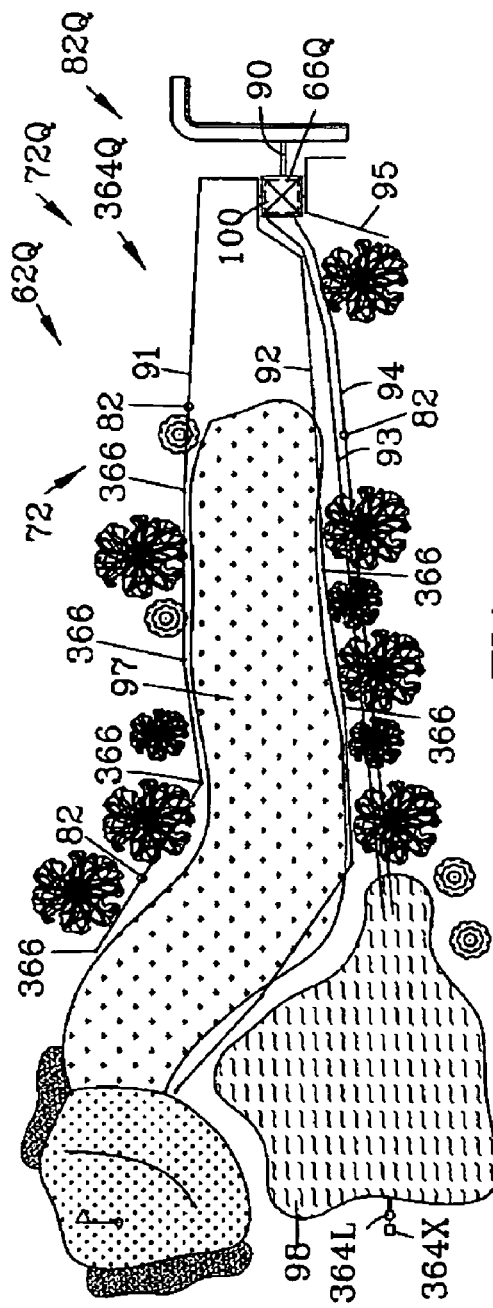
FIG. 22 is a top view of a user site shown as a golf course incorporating the remote valve unit of the present invention.

FIG. 21 is a block diagram of a second portion of FIG. 19 illustrating the operation of the comparator 440 for modifying the user set parameters of the weather based controller 410. The tolerance controller 430 establishes a user selected acceptable difference between the desired levels of the user set parameters of the weather based controller 410 and the actual levels of the sensor based controller 420.

The time delay 441 delays the comparator 440 from comparing the moisture predicted by weather based controller 410 with the actual moisture measured by the sensor based controller 420 for a period of time after the irrigation of the user site 62.

In one example, the comparator 440 compares the moisture predicted by weather based controller 410 in the user site 62 with the actual moisture in the user site 62 as measured by the moisture sensor 426. If the difference between the weather based controller 410 and the moisture sensor 426 exceeds level of the tolerance controller 430, the adjust 443 of the comparator 440 adjusts the user set parameters 411 for the weather based control 410 to bring the difference within the level of the tolerance controller 430. If the difference between the weather based controller 410 and the sensor based controller 420 is within the level of the tolerance controller 430, the adaptive control 400 maintains the user set parameters 411 for the weather based control 410.

Table 1 sets forth definitions used in the following tables and equations.

TABLE 1

| | |
|---|---|
| ASA | Allowable Surface Accumulation |
| Ef | Efficiency |
| ET | Evapotranspiration |
| Etc | Crop Evapotranspiration |
| ETo | Reference Evapotranspiration |
| Kc | Crop (Turf) Coefficient |
| Kd | Density Factor |
| Kmc | Micro climate Factor |
| Kl | Landscape Coefficient |
| Ks | Species Factor |
| Pr | Precipitation Rate |
| RZWWS | Root Zone Working Water Storage |

It should be appreciated by those skilled in the art that the user set parameters 411 for the weather based control 410 may include other variables depending upon the specific environment and/or plant life.

Table 2 sets forth a first example of initial parameters entered into the adaptive control 400. Many of these values have been arrived at through empirical data.

TABLE 2

| Item No. | Description | Original Parameters | User Defined Correction Value | First Cycle Adjustment | Second Cycle Adjustment |
|---|---|---|---|---|---|
| 1 | Soil Texture | Silty Clay | — | — | |
| 2 | Slope % | 10% | — | — | |
| 3 | Exposure | Full Sun | — | — | |
| 4 | Root Zone Working Water Storage (RZWWS) in | 0.55 | 0.10 | 0.5408 | 0.548 |
| 5 | Vegetation | Bermuda | — | — | |
| 6 | Crop Coefficient (June) ($K_C$) | 0.71 | 0.20 | 0.7337 | 0.7142 |
| 7 | Landscape Coefficient | N/A | — | | |
| | $K_s$ | — | — | | |
| | $K_D$ | — | — | | |
| | $K_{MC}$ | — | — | | |
| | $K_L$ | — | | | |
| 8 | Precipitation Rate ($P_R$) (in/hr) | 1.60 | 0.23 | 1.5385 | 1.5856 |
| 9 | Estimated Application Efficient % | 60 | 0.20 | 57.996 | 59.5387 |
| 10 | Basic Soil Intake Rate (in/hr) | 0.15 | 0.15 | 0.1462 | 0.1491 |
| 11 | Allowable Surface Accumulation ASA (in) | 0.16 in | 0.12 | 0.1568 | 0.1593 |
| | TOTAL | | 1.0 | | |

Table 3 sets forth an example of user defined parameters entered into the adaptive control 400.

TABLE 3

| | |
|---|---|
| Target Moisture Value | 12% |
| Tolerance Range | 10% |
| Limit Of Variation | From 10.8% To 13.2% |

The user defined Correction Value must add up to 1.0 or (100%). The first cycle run resulted in a 10% moisture value. The second cycle run resulted in a 13.6% moisture value. When calculating either a crop or a landscape coefficient, a negative sign is assigned to this value. The first and second adjustment factors are given by the following equations:

$$\text{First Adjustment Factor} := \frac{\text{Target} - \text{Actual}}{\text{Target}} = \frac{12.0 - 10.0}{12.0} = 0.167$$

$$\text{Second Adjustment Factor} := \frac{12.0 - 13.6}{12.0} = -0.133$$

First Cycle Adjustment=Parameter Value−(Parameter Value)(Adjustment Factor×Correction Value)

EXAMPLE 1

Root Zone Working Water Storage

First Cycle Adjustment=0.55−0.55(0.167×0.10)= 0.5408

Second Cycle Adjustment=0.5408−0.5408(−0.133× 0.10)=0.5480

EXAMPLE 2

Crop Coefficient ($K_C$)

First Cycle Adjustment=0.71−(−0.71)(0.167×0.20)= 0.7337

Second Cycle Adjustment=0.7337−(−0.7337)(0.133× 0.20)=0.7142

Table 4 sets forth a second example of initial parameters entered into the adaptive control 400.

TABLE 4

| | Description | Original Parameters | User Defined Correction Value | First Cycle Adjustment | Second Cycle Adjustment |
|---|---|---|---|---|---|
| 1 | Soil Texture | Sandy Loam | — | — | |
| 2 | Slope % | 12% | | — | |
| 3 | Exposure | 50% | — | — | |
| 4 | Root Zone Working Water Storage (RZWWS) in | 2.00 | 0.05 | 2.0111 | 1.9999 |
| 5 | Vegetation | Woody Shrubs | — | — | |
| 6 | Crop Coefficient (June) (KC) | N/A | | | |
| 7 | Landscape Coefficient | | | | |
| | Ks | 0.5 | 0.10 | 0.4889 | 0.4943 |
| | KD | 1.0 | 0.10 | 0.9778 | 0.9887 |
| | KMC | 0.8 | 0.05 | 0.7911 | 0.7955 |
| | KL | 0.40 | | | |
| 8 | Precipitation Rate (PR) (in/hr) | 1.40 | | 1.4467 | 1.4226 |
| 9 | Estimated Application Efficient % | 75 | | 79.17 | 76.97 |
| 10 | Basic Soil Intake Rate (in) | 0.4 In/Hr | | 0.4133 | 0.4064 |
| 11 | Allowable Surface Accumulation ASA (in) | 0.24 | 0.15 | 0.2480 | 0.2439 |
| | TOTAL | | 1.0 | | |

Table 5 sets forth an example of user defined parameters entered into the adaptive control 400.

TABLE 5

| Target Moisture Value | 9% |
|---|---|
| Tolerance Range | 5% |
| Limit Of Variation | From 9.45% To 8.55% |

The user defined Correction Value must add up to 1.0 or (100%). The first cycle run resulted in a 11% moisture value. The second cycle run resulted in a 8% moisture value. When calculating either a crop or a landscape coefficient, a negative sign is assigned to this value. The first and second adjustment factors are given by the following equations:

$$\text{First Adjustment Factor} = \frac{\text{Target} - \text{Actual}}{\text{Target}} = \frac{9.0 - 11.0}{9.0} = -0.2222$$

$$\text{Second Adjustment Factor} = \frac{9.0 - 8.0}{9.0} = 0.1111$$

First Cycle Adjustment=Parameter Value−(Parameter Value (Note 4)) (Adjustment Factor×Correction Value)

EXAMPLE 3

Root Zone Working Water Storage

Root Zone Working Water Storage

First Cycle Adjustment=2.00−2.00(−0.2222×0.05)= 2.0111

Second Cycle Adjustment=2.0111−2.0111(0.1111× 0.05)=1.9999

EXAMPLE 4

Landscape Coefficient—Species Factor (KS)

First Cycle Adjustment=0.5−(−0.5)(−0.2222×0.1)= 0.4889

Second Cycle Adjustment=0.4889−(−0.4889)(0.1111× 0.1)=0.4943

Figure 23:
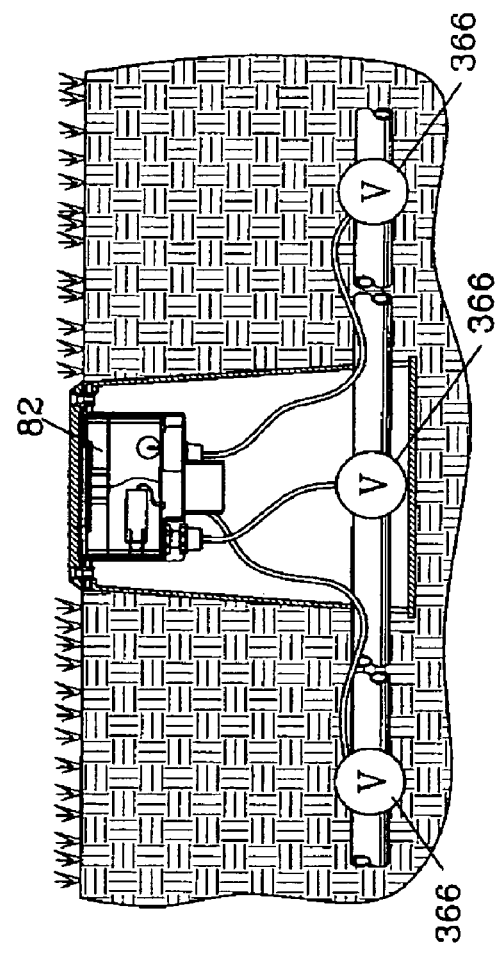
FIG. 23 is an enlarged side sectional view of an example of a remote valve unit of the present invention.

FIG. 23 is a top view of a user site shown as a golf course incorporating a plurality of the user wireless transceiver 82 and remote valve units 366. Preferably, the user wireless transceiver 82 provides wireless communicated to proximate wireless transceivers including adjacent remote user wireless transceiver 82 to form a mesh network. The use of a plurality of the user wireless transceiver 82 eliminates the need for extending electrical wires as required by conventional irrigation valves.

The user wireless transceiver 82 is connected to one or more remote valve units 366 for operating the electrically operated valve 366 in accordance with the information received by the wireless transceiver 82. The wireless transceiver 82 opens and closes the electrically operated valve 366 in accordance with communications from the remote transceiver.

Figure 24:
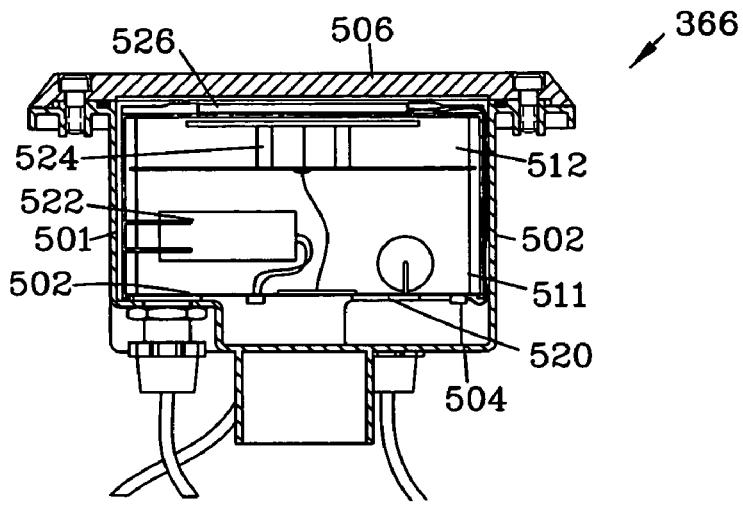
FIG. 24 is an enlarged view of a portion of FIG. 23.
Figure 25:
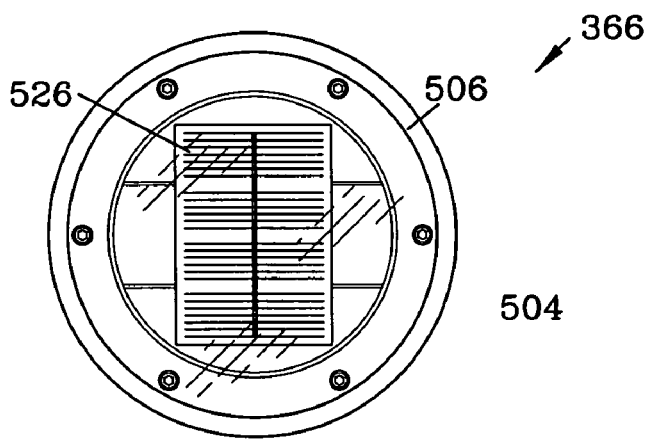
FIG. 25 a top view of FIG. 24.
Figure 26:
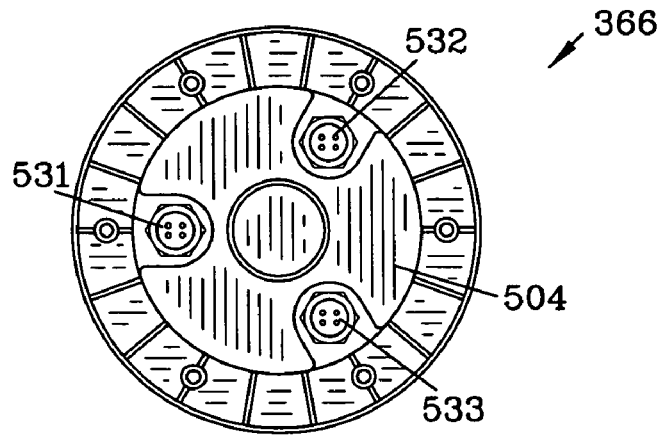
FIG. 26 a bottom view of FIG. 24.

FIGS. 23-25 are various views of an example of a remote valve unit 366 of the present invention. The remote controlled valve unit 366 comprises a container 500 comprises sidewalls 501 and 502 and a bottom wall 504. A removable top wall 506 closes the container 500 to form a water tight container 500 to be buried in the ground.

The container 500 defines a lower portion 511 and an upper portion 512. The lower portion 511 of the container 500 receives a wireless transceiver and control circuit 520. A rechargeable battery 522 powers the wireless transceiver and control circuit 520. An upper portion 512 of the container 500 receives an antenna 524 connected to the wireless transceiver 520.

A photovoltaic solar collector 526 recharges the rechargeable battery 524 during daylight hours. The wireless transceiver and control circuit 520 controls the recharging of the rechargeable battery 524 by the photovoltaic solar collector 526.

A plurality of connectors 531-533 are mounted to the bottom wall 504 of the container 500. The plurality of connectors 531-533 are connected to the wireless transceiver and control circuit 520 for controlling externally located electrically operated valves 366 as shown in FIG. 23.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An adaptive control for controlling an irrigation system for irrigating soil in an irrigated region, comprising:
    a weather based control having a programmable memory for storing user set parameters related to the environment and plant life to provide a desired moisture level in the soil in the irrigated region;
    a connector connecting said weather based controller to the irrigation system for watering the soil in an irrigated region in accordance with said user set parameters;
    a moisture sensor located in the soil in the irrigated region for sensing an actual moisture level in the soil in the irrigated region;
    a sensor based controller connected to said moisture sensor for sensing an actual moisture level in the soil in the irrigated region;
    a comparator for comparing said actual moisture level in the soil of the irrigated region from said sensor based controller with said desired moisture level provided by said user set parameters;
    a tolerance control having an input enabling a user to enter a tolerance range of said desired moisture level in the soil in the irrigated region establishing a user acceptable limit of variation between said desired moisture level of said weather based controller and the actual moisture level as measured by the moisture sensor;
    said tolerance control connected to said comparator for maintaining said parameters stored in said programmable memory of said weather based control when the moisture in the soil in the irrigated region is within said user acceptable limit of variation between said desired moisture level of said weather based controller and the actual moisture level as measured by the moisture sensor; and
    an adjustment in the comparator for modifying said parameters stored in said programmable memory of said weather based control when the moisture in the soil in the irrigated region exceeds said user acceptable limit of variation between said desired moisture level of said weather based controller and the actual moisture level as measured by the moisture sensor.

2. An adaptive control for controlling an irrigation system as set forth in claim 1, wherein said desired moisture level in the soil in the irrigated region is a percentage of moisture desired the soil in the irrigated region.

3. An adaptive control for controlling an irrigation system as set forth in claim 1, wherein said desired moisture level in the soil in the irrigated region is a percentage of moisture desired the soil in the irrigated region; and
    said tolerance range being expressed as a percentage of said percentage of moisture desired the soil in the irrigated region.

4. An adaptive control for controlling an irrigation system as set forth in claim 1, wherein said desired moisture level in the soil in the irrigated region is a percentage of moisture desired the soil in the irrigated region; and
    said tolerance range being expressed as a percentage above and below of said percentage of moisture desired the soil in the irrigated region.

5. An adaptive control for controlling an irrigation system as set forth in claim 1, including a time delay interposed between said tolerance control and said comparator for delaying said comparator from comparing said actual moisture level in the soil of the irrigated region from said sensor based controller with said desired moisture level provided by said user set parameter for a period of time after the irrigation of the soil in the irrigated region.

6. An adaptive control for controlling an irrigation system for irrigating soil in an irrigated region, comprising:
    a weather based control having a programmable memory for storing user set parameters related to the environment and plant life to provide a desired moisture level in the soil in the irrigated region;
    a connector connecting said weather based controller to the irrigation system for watering the soil in an irrigated region in accordance with said user set parameters;
    a moisture sensor located in the soil in the irrigated region for sensing an actual moisture level in the soil in the irrigated region;
    a sensor based controller connected to said moisture sensor for sensing an actual moisture level in the soil in the irrigated region;
    a comparator for comparing said actual moisture level in the soil of the irrigated region from said sensor based controller with said desired moisture level provided by said user set parameters;
    a tolerance control having an input enabling a user to enter a tolerance range of said desired moisture level in the soil in the irrigated region establishing a user acceptable limit of variation between said desired moisture level of said weather based controller and the actual moisture level as measured by the moisture sensor;
    said user acceptable limit of variation defining a tolerance range expressed as a percentage above and below of said desired the soil in the irrigated region,
    said tolerance control connected to said comparator for maintaining said parameters stored in said programmable memory of said weather based control when the moisture in the soil in the irrigated region is within said user acceptable limit of variation between said desired moisture level of said weather based controller and the actual moisture level as measured by the moisture sensor;

an adjustment in the comparator for modifying said parameters stored in said programmable memory of said weather based control when the moisture in the soil in the irrigated region exceeds said user acceptable limit of variation between said desired moisture level of said weather based controller and the actual moisture level as measured by the moisture sensor; and a time delay interposed between said tolerance control and said comparator for delaying said comparator from comparing said actual moisture level in the soil of the irrigated region from said sensor based controller with said desired moisture level provided by said user set parameter for a period of time after the irrigation of the soil in the irrigated region.

* * * * *